(12) United States Patent
Abrams et al.

(10) Patent No.: US 10,815,012 B2
(45) Date of Patent: *Oct. 27, 2020

(54) DEPLOYABLE SHEET MATERIAL SYSTEMS AND METHODS

(71) Applicant: Analytical Mechanics Associates, Inc., Hampton, VA (US)

(72) Inventors: John L. Abrams, Englewood, CO (US); Matthew E. Duchek, Boulder, CO (US); Alberto Paz, Littleton, CO (US); Ryan A. Harbach, Lakewood, CO (US); Alexi S. Rakow, Boulder, CO (US)

(73) Assignee: ANALYTICAL MECHANICS ASSOCIATES, INC., Hampton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,746

(22) Filed: Oct. 10, 2019

(65) Prior Publication Data

US 2020/0055618 A1    Feb. 20, 2020

Related U.S. Application Data

(63) Continuation of application No. 16/259,679, filed on Jan. 28, 2019, now abandoned, which is a continuation of application No. 15/154,534, filed on May 13, 2016, now Pat. No. 10,189,583.

(60) Provisional application No. 62/160,965, filed on May 13, 2015.

(51) Int. Cl.
*B64G 1/22* (2006.01)
*B64G 1/44* (2006.01)

(52) U.S. Cl.
CPC ............... *B64G 1/222* (2013.01); *B64G 1/44* (2013.01)

(58) Field of Classification Search
CPC .......... B64G 1/222; B64G 1/34; B64G 1/407; B64G 1/44; B64G 1/66
See application file for complete search history.

(56) References Cited

U.S. PATENT DOCUMENTS

| | | | | |
|---|---|---|---|---|
| 3 A | * | 8/1836 | Blanchard | G01B 7/107 142/42 |
| 6 A | * | 8/1836 | Blanchard | B27C 5/06 144/134.1 |
| 9 A | * | 8/1836 | Blanchard | B25C 1/02 227/147 |
| 3,169 A | * | 7/1843 | Mollineaux | B22D 17/24 164/345 |
| 3,608 A | * | 5/1844 | Burke | D06B 3/10 68/22 R |

(Continued)

OTHER PUBLICATIONS

Dhere et al., "CIGS2 Thin-Film Solar Cells on Flexible Foils for Space Power," NASA/CP-2002-211831, 91-100.

(Continued)

*Primary Examiner* — Medhat Badawi
(74) *Attorney, Agent, or Firm* — Mueting Raasch Group

(57) ABSTRACT

Exemplary deployable sheet material systems may be configured to stow and deploy sheet material. The systems may include one or more masts, one or more extendable booms, and one or more guys wires configured to function in conjunction with each other to deploy the sheet material and then to maintain the sheet material in the deployed configuration.

19 Claims, 12 Drawing Sheets

(56) References Cited

U.S. PATENT DOCUMENTS

| | | | | |
|---|---|---|---|---|
| 3,785 A * | 10/1844 | Gould | D01G 9/06 | 19/128 |
| 4,225 A * | 10/1845 | Brown | B27C 1/12 | 144/128 |
| 5,228 A * | 8/1847 | Willoughby et al. | A01D 34/13 | 56/299 |
| 5,961 A * | 12/1848 | Pratt | B61G 1/06 | 213/179 |
| 9,120 A * | 7/1852 | Reading | A01F 11/06 | 460/46 |
| 98,564 A * | 1/1870 | Conklin | A41F 3/00 | 2/327 |
| 309,337 A * | 12/1884 | Cooke | A01B 29/048 | 172/68 |
| 426,560 A * | 4/1890 | Dithridge | | 52/690 |
| 764,486 A * | 7/1904 | Moore | B01D 37/00 | 210/772 |
| 3,144,104 A * | 8/1964 | Weir | F16L 9/17 | 52/108 |
| 3,169,725 A * | 2/1965 | Berglund | B64G 1/12 | 244/158.3 |
| 3,213,573 A * | 10/1965 | Bohr | B21C 37/10 | 52/108 |
| 3,300,910 A * | 1/1967 | Isaac | E04C 3/005 | 52/2.19 |
| 3,362,656 A * | 1/1968 | Wyatt | B64G 1/34 | 244/167 |
| 3,363,857 A * | 1/1968 | Vilbig | B64G 1/281 | 244/158.1 |
| 3,387,414 A * | 6/1968 | Adams | E04C 3/005 | 52/108 |
| 3,480,232 A * | 11/1969 | Wyatt | B64G 1/32 | 244/167 |
| 3,499,610 A * | 3/1970 | Leonard | H01Q 1/087 | 242/390.2 |
| 3,508,587 A * | 4/1970 | Mauch | F16L 11/121 | 138/119 |
| 3,521,290 A * | 7/1970 | Bahiman | B64G 1/22 | 343/915 |
| 3,528,543 A * | 9/1970 | Robinsky | B65D 85/67 | 428/178 |
| 3,532,299 A * | 10/1970 | Baker | B64G 1/443 | 244/172.7 |
| 3,589,632 A * | 6/1971 | Rew | B21C 47/003 | 436/509 |
| 3,608,844 A * | 9/1971 | Tumulty, Jr. | B21C 47/18 | 242/899 |
| 3,690,080 A * | 9/1972 | Dillard | B64G 1/222 | 52/108 |
| 3,696,568 A * | 10/1972 | Berry | E04C 3/005 | 52/108 |
| 3,735,943 A * | 5/1973 | Fayet | B64G 1/222 | 244/172.7 |
| 3,749,133 A * | 7/1973 | Bochory | F16L 11/121 | 138/119 |
| 3,785,590 A * | 1/1974 | Wentworth | B64G 1/222 | 244/1 R |
| 3,809,337 A * | 5/1974 | Andrews | B64G 1/222 | 244/172.7 |
| 3,811,633 A * | 5/1974 | Cummings | B29C 53/20 | 226/172 |
| 3,817,481 A * | 6/1974 | Berks | B64G 1/222 | 244/172.7 |
| 3,848,821 A * | 11/1974 | Scheel | B64G 1/222 | 242/899 |
| 3,862,528 A * | 1/1975 | Meissinger | B64G 9/00 | 52/108 |
| 4,018,397 A * | 4/1977 | Rusch | B21C 37/10 | 242/388.6 |
| 4,030,102 A * | 6/1977 | Kaplan | H01Q 15/161 | 343/915 |
| 4,047,339 A * | 9/1977 | Smith | E04C 3/005 | 52/108 |
| 4,133,501 A * | 1/1979 | Pentlicki | B64G 1/443 | 244/172.6 |
| 4,225,871 A * | 9/1980 | Ramari | H01Q 1/087 | 343/877 |
| 4,265,690 A * | 5/1981 | Lowenhar | H01P 3/00 | 156/148 |
| 4,384,163 A * | 5/1983 | Rauschenbach | B64G 1/222 | 136/245 |
| 4,426,053 A * | 1/1984 | Chenin | B64G 1/222 | 136/245 |
| 4,579,302 A * | 4/1986 | Schneider | B64G 9/00 | 136/292 |
| 4,630,791 A * | 12/1986 | Chapman | B64G 1/14 | 136/245 |
| 4,991,784 A * | 2/1991 | Schmid | B64G 9/00 | 242/390.3 |
| 5,228,644 A * | 7/1993 | Garriott | B64G 1/443 | 136/245 |
| 5,235,788 A * | 8/1993 | Maimets | B64G 4/00 | 244/172.6 |
| 5,296,044 A * | 3/1994 | Harvey | H02S 30/20 | 136/245 |
| 5,314,146 A * | 5/1994 | Chicoine | B64G 1/10 | 244/159.4 |
| 5,520,747 A * | 5/1996 | Marks | B64G 1/222 | 136/245 |
| 5,720,452 A * | 2/1998 | Mutschler, Jr. | B64G 1/222 | 244/172.7 |
| 5,779,195 A * | 7/1998 | Basuthakur | B64G 1/007 | 244/173.1 |
| 5,833,176 A * | 11/1998 | Rubin | B64G 1/222 | 244/172.7 |
| 5,865,905 A * | 2/1999 | Clemens | H01L 31/0547 | 126/624 |
| 5,961,738 A * | 10/1999 | Benton | B64G 1/44 | 136/245 |
| 6,016,999 A * | 1/2000 | Simpson | B64G 1/1007 | 244/159.5 |
| 6,017,002 A * | 1/2000 | Burke | B64G 1/222 | 136/245 |
| 6,051,775 A * | 4/2000 | Brown | B64G 1/222 | 136/245 |
| 6,206,327 B1 * | 3/2001 | Benedetti | B64G 1/10 | 244/159.4 |
| 6,217,975 B1 * | 4/2001 | Daton-Lovett | B65G 15/08 | 428/105 |
| 6,256,938 B1 * | 7/2001 | Daton-Lovett | F16H 19/064 | 138/119 |
| 6,286,787 B1 * | 9/2001 | Fleeter | B64G 1/007 | 244/110 D |
| 6,343,442 B1 * | 2/2002 | Marks | B64G 1/222 | 244/172.6 |
| 6,374,565 B1 * | 4/2002 | Warren | B64G 1/222 | 138/119 |
| 6,423,895 B1 * | 7/2002 | Murphy | H02S 30/20 | 136/245 |
| 6,437,232 B1 * | 8/2002 | Dailey | B64G 1/222 | 136/245 |
| 6,478,261 B2 * | 11/2002 | Laraway | B64G 1/222 | 244/172.6 |
| 6,508,036 B1 * | 1/2003 | Cadogan | B64G 1/222 | 52/108 |
| 6,543,725 B1 * | 4/2003 | Meurer | B64G 1/443 | 136/245 |
| 6,547,190 B1 * | 4/2003 | Thompson | B64G 1/443 | 244/172.7 |
| 6,550,720 B2 * | 4/2003 | Fleeter | B64G 1/641 | 244/110 D |
| 6,568,638 B1 * | 5/2003 | Capots | B64G 1/10 | 244/159.4 |
| 6,637,702 B1 * | 10/2003 | McCandless | B64G 1/222 | 244/172.6 |
| 6,843,029 B2 * | 1/2005 | Breitbach | B64G 1/222 | 52/108 |

(56) References Cited

U.S. PATENT DOCUMENTS

| | | | | |
|---|---|---|---|---|
| 6,888,513 B1* | 5/2005 | Graham | B64G 1/222 | 343/880 |
| 6,942,186 B1* | 9/2005 | Levin | B64G 1/648 | 244/158.2 |
| 7,104,506 B1* | 9/2006 | Goodzeit | B64G 1/222 | 244/168 |
| 7,211,722 B1* | 5/2007 | Murphy | H02S 20/00 | 136/245 |
| 7,617,639 B1* | 11/2009 | Pollard | B64G 1/222 | 343/915 |
| 7,694,486 B2* | 4/2010 | Murphy | B64G 1/222 | 52/645 |
| 7,895,795 B1* | 3/2011 | Murphey | B64G 1/222 | 52/108 |
| 8,167,247 B2* | 5/2012 | Daily | G02B 26/02 | 244/158.1 |
| 8,181,618 B2* | 5/2012 | Storm | F02B 23/0654 | 123/143 B |
| 8,292,232 B1* | 10/2012 | Andrews | B64G 1/62 | 244/159.1 |
| 8,356,774 B1* | 1/2013 | Banik | B64G 1/407 | 244/159.5 |
| 8,616,502 B1* | 12/2013 | Stribling | B64G 1/44 | 244/172.7 |
| 8,636,253 B1* | 1/2014 | Spence | B64G 1/222 | 244/172.8 |
| 8,683,755 B1* | 4/2014 | Spence | B64G 1/222 | 136/245 |
| 8,770,522 B1* | 7/2014 | Murphey | B64G 1/222 | 244/159.4 |
| 8,816,187 B1* | 8/2014 | Stribling | H02S 30/20 | 136/245 |
| 8,893,442 B1* | 11/2014 | Spence | E04C 3/005 | 52/108 |
| 8,894,017 B1* | 11/2014 | Baghdasarian | B64G 1/443 | 136/245 |
| 8,905,357 B1* | 12/2014 | Harvey | B64G 1/007 | 244/168 |
| 9,004,410 B1* | 4/2015 | Steele | B64G 1/443 | 244/172.7 |
| 9,016,635 B2* | 4/2015 | Hoyt | B64G 1/007 | 244/158.2 |
| 9,120,583 B1* | 9/2015 | Spence | H02S 30/20 | |
| 9,156,568 B1* | 10/2015 | Spence | B64G 1/222 | |
| 9,550,584 B1* | 1/2017 | Harvey | B64G 1/222 | |
| 9,580,190 B1* | 2/2017 | Spence | B64G 1/222 | |
| 9,605,430 B2* | 3/2017 | Baudasse | E04C 3/005 | |
| 9,611,056 B1* | 4/2017 | Spence | B64G 1/443 | |
| 9,718,639 B2* | 8/2017 | Baudasse | B64G 1/222 | |
| 9,856,039 B2* | 1/2018 | Abrams | B64G 1/222 | |
| 9,919,815 B2* | 3/2018 | Steele | B64G 1/443 | |
| 9,975,652 B2* | 5/2018 | Blanchard | B64G 1/222 | |
| 10,059,471 B2* | 8/2018 | Steele | B65H 75/28 | |
| 10,189,583 B2 | 1/2019 | Abrams et al. | | |
| 2002/0096603 A1* | 7/2002 | Bauer | B64G 1/222 | 244/172.7 |
| 2002/0112417 A1* | 8/2002 | Brown | B64G 1/222 | 52/108 |
| 2003/0000569 A1* | 1/2003 | Zwanenburg | B64G 1/222 | 136/251 |
| 2003/0015625 A1* | 1/2003 | McGee | B64G 1/222 | 244/172.6 |
| 2003/0015626 A1* | 1/2003 | Wolf | A63H 19/14 | 246/187 A |
| 2003/0057330 A1* | 3/2003 | Deel | B64G 1/222 | 244/172.8 |
| 2003/0164186 A1* | 9/2003 | Clark | B64G 1/222 | 136/245 |
| 2003/0182878 A1* | 10/2003 | Warren | B64G 1/222 | 52/108 |
| 2005/0178921 A1* | 8/2005 | Stribling | B64G 1/222 | 244/172.7 |
| 2006/0185277 A1* | 8/2006 | Quincieu | B64G 1/10 | 52/265 |
| 2006/0207189 A1* | 9/2006 | Pryor | B64G 1/222 | 52/1 |
| 2007/0145195 A1* | 6/2007 | Thomson | B64G 1/222 | 244/172.6 |
| 2007/0262204 A1* | 11/2007 | Beidleman | B64G 1/222 | 244/172.6 |
| 2008/0143636 A1* | 6/2008 | Couchman | B64G 1/66 | 343/915 |
| 2009/0057492 A1* | 3/2009 | Harris | B64G 1/222 | 244/164 |
| 2009/0173831 A1* | 7/2009 | Roseman | B64G 1/12 | 244/159.6 |
| 2009/0184207 A1* | 7/2009 | Warren | B64G 1/222 | 244/172.6 |
| 2009/0218448 A1* | 9/2009 | Peypoudat | B64G 1/007 | 244/158.7 |
| 2010/0163684 A1* | 7/2010 | Dando | B64G 1/222 | 244/172.6 |
| 2010/0187364 A1* | 7/2010 | Kutter | B64G 1/1078 | 244/171.7 |
| 2010/0187365 A1* | 7/2010 | Kutter | B64G 1/1078 | 244/171.7 |
| 2011/0162690 A1* | 7/2011 | Workman | H02S 30/20 | 136/245 |
| 2011/0204186 A1* | 8/2011 | Keller | B64G 1/222 | 244/172.6 |
| 2011/0210209 A1* | 9/2011 | Taylor | B64G 1/222 | 244/172.6 |
| 2011/0253193 A1* | 10/2011 | Korman | H01L 31/048 | 136/245 |
| 2011/0253614 A1* | 10/2011 | Curran | H02S 30/20 | 210/239 |
| 2011/0253827 A1* | 10/2011 | Watanabe | B64G 1/222 | 242/370 |
| 2012/0012154 A1* | 1/2012 | Keller | B64G 1/222 | 136/245 |
| 2012/0025750 A1* | 2/2012 | Margo | H01M 10/465 | 320/101 |
| 2012/0090660 A1* | 4/2012 | Keller | B64G 1/222 | 136/245 |
| 2012/0167943 A1* | 7/2012 | Blanchard | B64G 1/222 | 136/245 |
| 2012/0167944 A1* | 7/2012 | Blanchard | B64G 1/222 | 136/245 |
| 2013/0061541 A1* | 3/2013 | Taylor | F16S 5/00 | 52/108 |
| 2013/0186011 A1* | 7/2013 | Keller | E04H 12/00 | 52/108 |
| 2013/0233371 A1* | 9/2013 | Rodin | H02S 30/20 | 136/245 |
| 2014/0042275 A1* | 2/2014 | Abrams | B64G 1/222 | 244/172.6 |
| 2014/0123575 A1* | 5/2014 | Bobbio | E04H 12/185 | 52/108 |
| 2014/0151485 A1* | 6/2014 | Baudasse | B64G 1/222 | 242/375 |
| 2014/0151486 A1* | 6/2014 | Chen | B65H 75/4434 | 242/379 |
| 2014/0230949 A1* | 8/2014 | Daton-Lovett | B64G 1/222 | 138/177 |
| 2014/0263844 A1* | 9/2014 | Cook, Jr. | B64G 1/22 | 244/164 |
| 2015/0102172 A1* | 4/2015 | Thurn | B64G 1/40 | 244/158.2 |
| 2015/0144740 A1* | 5/2015 | Turse | B64G 1/44 | 244/172.6 |
| 2015/0259911 A1* | 9/2015 | Freebury | E04C 3/005 | 52/108 |
| 2015/0284955 A1* | 10/2015 | Adams | E04C 3/005 | 52/108 |
| 2015/0368903 A1* | 12/2015 | Turse | B65H 75/4402 | 242/407 |

(56) References Cited

U.S. PATENT DOCUMENTS

| | | | | |
|---|---|---|---|---|
| 2016/0010333 A1* | 1/2016 | Freebury | ............... | E04C 3/005 52/646 |
| 2016/0023781 A1* | 1/2016 | Baudasse | ............... | B64G 1/44 52/108 |
| 2016/0024790 A1* | 1/2016 | Baudasse | ............... | E04C 3/005 52/108 |
| 2016/0032609 A1* | 2/2016 | Kucinski | ............... | B21C 37/0818 52/108 |
| 2016/0122041 A1* | 5/2016 | Abrams | ............... | B64G 1/222 244/172.6 |
| 2016/0137319 A1* | 5/2016 | Steele | ............... | B64G 1/443 52/745.2 |
| 2016/0311558 A1* | 10/2016 | Turse | ............... | B64G 1/222 |
| 2016/0332752 A1* | 11/2016 | Abrams | ............... | B64G 1/222 |
| 2017/0021947 A1* | 1/2017 | Pellegrino | ............... | H02J 3/383 |
| 2017/0063296 A1* | 3/2017 | Cruijssen | ............... | H02S 40/22 |
| 2017/0158357 A1* | 6/2017 | Hart, III | ............... | B64G 1/66 |
| 2017/0297749 A1* | 10/2017 | Steele | ............... | B65H 75/28 |
| 2017/0298628 A1* | 10/2017 | Rakow | ............... | E04C 3/005 |
| 2017/0320600 A1* | 11/2017 | Cruijssen | ............... | H01L 31/041 |
| 2018/0111703 A1* | 4/2018 | Hensley | ............... | H01Q 1/1235 |
| 2019/0263540 A1 | 8/2019 | Abrams et al. | | |

OTHER PUBLICATIONS

Hopkins, "Stepping Stones: Exploring Increasingly Challenging Destinations on the Way to Mars," Lockheed Martin, 2012.

NASA, "Combination Methods for Structural Deriving Design Loads Considering Vibro-Acoustic, etc., Responses," NASA PD-ED-1211, Lesson Date: Feb. 1, 1999, Lesson Number: 652, 1-4.

Pappa et al, "Solar Array Structures for 300 kW-Class Spacecraft," Space Power Workshop, Manhattan Beach, CA, Apr. 24, 2013.

Penson et al., "Hypervelocity Impact Studies on Space Tethers," 54$^{th}$ International Astronautical Congress of the International Astronautical Federation, the International Academy of Astronautics, and the International Institute of Space Law, Bremen, Germany, *International Astronautical Federation*, Sep. 29-Oct. 3, 2003.

Vanguard Space Technologies, 2014. [Online]. Available: http://vst-inc.com/satellite-components/solar-power-systems/flexible-solar-panels/.

* cited by examiner

DEPLOYABLE SHEET MATERIAL SYSTEMS AND METHODS

CROSS-REFERENCE TO RELATED APPLICATIONS

This is a continuation application of U.S. patent application Ser. No. 16/259,679, filed Jan. 28, 2019, which is a continuation application of U.S. patent application Ser. No. 15/154,534, filed May 13, 2016, which claims the benefit of U.S. Provisional Patent Application Ser. No. 62/160,965 filed 13 May 2015, entitled "DEPLOYABLE TENSIONED SYSTEM," each of which is incorporated herein by reference in its entirety.

This invention was made with Government support under contract NNX14CL64P awarded by NASA. The Government has certain rights in the invention.

SUMMARY

The present disclosure relates generally to exemplary deployable sheet material systems for use in stowing and deploying sheet material such as, e.g., solar arrays to provide solar power to spacecraft, solar sails to provide propulsion to spacecraft, drag apparatus to de-orbit spacecraft, etc. The exemplary deployable sheet material systems may be further used with non-spacecraft systems and apparatus. For example, the exemplary deployable sheet material systems may be used with, or in conjunction with, terrestrial apparatus and systems for stowing and deploying sheet material (e.g., solar arrays, polyimide films, etc.) for use with military and research outposts, rapid disaster relief, and/or outdoor recreation.

An exemplary spacecraft system for deploying sheet material described herein may include a primary beam member extending from a first end region to a second end region, a first mast coupled to the primary beam member, and a second mast coupled to the primary beam member opposite the first mast. Each of the first and second masts may extend from a proximal region coupled to the primary beam member to a distal region. The distal region of the first and second masts may be positioned farther from the primary beam member when the system is in a deployed configuration than when the system is in a stowed configuration. The exemplary spacecraft system may also include a spoolable apparatus coupled to the primary beam member. The spoolable apparatus may include a first boom member proximate the first end region of the primary beam member, a second boom member proximate the second end region of the primary beam member, and a sheet material extending from a proximal sheet region to a distal sheet region and located between the first and second boom members. The first boom member, second boom member, and the sheet material may be in a spooled state when the system is in the stowed configuration and the first boom member, second boom member, and the sheet material may be unspooled into an extended state when the system is in the deployed configuration. The exemplary spacecraft system may further include a plurality of guy wires. The plurality of guy wires may include a first guy wire extending from at least the distal region of the first mast to the first boom member, a second guy wire extending from at least the distal region of the first mast to the second boom member, a third guy wire extending from at least the distal region of the second mast to the first boom member, and a fourth guy wire extending from at least the distal region of the second mast to the second boom member.

In one or more embodiments, each of the first and second boom members may extend from a proximal boom region located proximate the primary beam member to a distal boom region when in the extended state. The first and third guy wires may extend to the distal boom region of the first boom member and the second and fourth guy wires may extend to the distal boom region of the second boom member. In one or more embodiments, the first and second boom members of the spoolable apparatus may be biased to extend along extension axes to deploy the first and second boom members and the sheet material from the spooled state to the extended state. In one or more embodiments, the spoolable apparatus may also include a spoolable apparatus actuator to restrict movement of the first and seconds boom members into the extended state along the extension axes and to release the first and seconds boom members to extend along the extension axes to deploy the first and second boom members and the sheet material from the spooled state to the extended state.

In one or more embodiments, the first mast may be biased to move relative to the primary beam member to move from the stowed configuration to the deployed configuration. The spacecraft system may also include a mast actuator to restrict movement of the first mast and to release the first mast such that the distal region of the first mast moves from proximate the primary beam member to a distance away from the primary beam member. In one or more embodiments, the sheet material may include one or more photovoltaic arrays. In one or more embodiments, the system may also include one or more tensioners to tension one or more of the plurality of guy wires.

In one or more embodiments, the first mast may include a first mast portion and a second mast portion. Each of the first and second mast portions may extend from a proximal mast portion region pivotably coupled to the primary beam member to a distal mast portion region. The proximal mast portion region of the first mast portion may be proximate the proximal mast portion region of the second mast portion. The proximal mast portion regions of the first and second mast portions may be located between the distal mast portion region of the first mast portion and the distal mast portion region of the second mast portion when in the stowed configuration. The distal mast portion region of the first mast portion may be proximate the distal mast portion region of the second mast portion when in the deployed configuration.

Another exemplary system for use in deploying sheet material described herein may include a primary beam member extending from a first end region to a second end region, one or more masts coupled to the primary beam member, a first boom member, and a second boom member. Each of the one or more masts may extend from a proximal region pivotably coupled to the primary beam member to a distal region. The first boom member may extend from a proximal first boom end region coupled to the first end region of the primary beam member to a distal first boom end region located farther away from the primary beam member than the proximal first boom end region. The second boom member may extend from a proximal second boom end region coupled to the second end region of the primary beam member to a distal second boom end region located farther away from the primary beam member than the proximal second boom end region. The exemplary system may also include a sheet material extending from a proximal sheet region proximate to the primary beam member to a distal sheet region located farther away from the primary beam member than the proximal sheet region. The sheet material may be further located between the first and second boom members. The exemplary system may further include one or more guy wires extending from at least the distal region of the one or more masts to the first boom member and the second boom member.

In one or more embodiments, the one or more masts may include a first mast pivotably coupled to the primary beam member and a second mast pivotably coupled to the primary beam member opposite the first mast. In one or more embodiments, the one or more guy wires may extend to the distal first boom end region of the first boom member and the distal second boom end region of the second boom member. In one or more embodiments, the one or more masts may be biased to move relative to the primary beam member. The system may also include one or more mast actuators to restrict the one or more masts from moving relative to the primary beam member and to release the one or more masts to move such that the distal region of the one or more masts is located farther away from the primary beam member than the proximal region of the one or more masts.

In one or more embodiments, the sheet material may include one or more photovoltaic arrays. In one or more embodiments, the system may also include one or more tensioners to tension the one or more of guy wires. In one or more embodiments, each of the one or more guy wire may extend from one of the first and second end regions of the primary beam member to one of the first and second boom members through the distal region of one of the one or more masts. In one or more embodiments, each of the one or more guy wires may extend from at least the distal region of the one or more masts to one of the distal first boom end region and the distal second boom end region.

An exemplary method of deploying sheet material from a spacecraft described herein may include providing a deployable system. The deployable system may include a primary beam member, one or more masts extending from a proximal region pivotably coupled to the primary beam member to a distal region, and a deployable apparatus coupled to the primary beam member and configurable in a stowed configuration and a deployed configuration. The deployable apparatus may include a plurality of boom members, and a sheet material extending between at least two of the plurality of boom members. The plurality of boom member and the sheet material may be located proximate the primary beam member when in the stowed configuration and extend from the primary beam member when in the deployed configuration. The deployable system may also include a plurality of guy wires extending from the distal region of one or more masts to the plurality of boom members. The method may also include moving the one or more masts relative the primary beam member to position the distal region of the one or more masts farther away from the primary beam member than when in the stowed configuration. Further, the method may include extending the plurality of boom members and the sheet material away from the primary beam member to deploy the sheet material.

In one or more embodiments, the deployable apparatus may be biased to extend into the deployed configuration and the method may also include releasing the deployable apparatus to extend away from the primary beam member. In one or more embodiments, the one or more masts may be biased to move relative the primary beam member to position the distal region of the one or more masts farther away from the primary beam member than when in the stowed configuration and the method may also include releasing the one or more masts to move relative the primary beam member to position the distal region of the one or more masts farther away from the primary beam member than when in the stowed configuration. In one or more embodiments, the method may further include tensioning the plurality of guy wires after the plurality of boom members and the sheet material are extended away from the primary beam member.

The above summary is not intended to describe each embodiment or every implementation of the present disclosure. A more complete understanding will become apparent and appreciated by referring to the following detailed description and claims taken in conjunction with the accompanying drawings.

DETAILED DESCRIPTION OF EXEMPLARY EMBODIMENTS

Figure 1A:
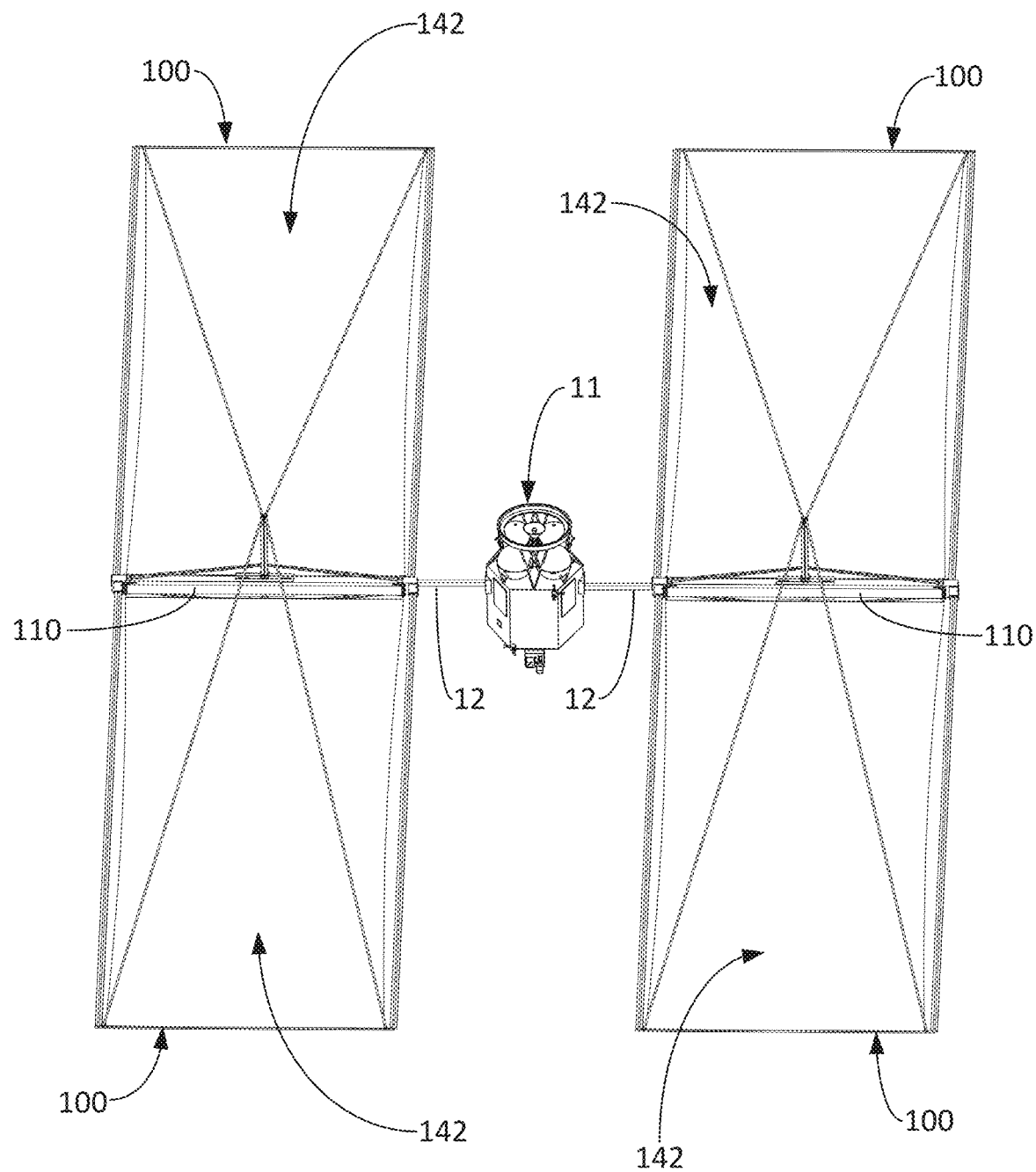
FIG. 1A is a perspective view of a plurality of exemplary deployable sheet material systems coupled to a spacecraft.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary embodiments shall be described with reference to FIGS. 1-10. It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus and systems using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Systems (e.g., spacecraft, terrestrial, etc.) including exemplary deployable sheet material systems are described herein. The deployable sheet material systems may be used to deploy and stabilize one or more portions of sheet material for use by the spacecraft (e.g., using tension). In one example, the sheet material may include a solar array capable of receiving incident solar radiation, converting the solar radiation into electrical power, and providing the electrical power to the spacecraft. Sheet material such as, e.g., flexible solar arrays, thin polyimide film (e.g. MYLAR or KAPTON blanket), metallic foil, scrim cloth, etc. may not have enough rigidity to maintain a deployment position by itself. Thus, the exemplary deployable sheet material systems may provide apparatus and structure to deploy such sheet material and to maintain such material in the deployed configuration. In at least one embodiment as described herein, the sheet material (e.g., rollable/spoolable solar array) may be deployed in a substantially-planar deployment configuration (e.g., the sheet material may substantially lie in a plane when deployed). To maintain the sheet material in the deployment configuration, the exemplary deployable sheet material systems described herein may place the sheet material under tension to extend the sheet material into, or lying substantial within, a plane.

Further, it may be described that the exemplary deployable sheet material systems described herein may define a "truss"-based structure to support any resultant loads from the deployed sheet material (e.g., a photovoltaic array). For example, one or more load-bearing members of the exemplary system may form, or define, a "truss"-based structure, and internal loads of such load-bearing members may be substantially in compression or tension, with bending loads within a member that may be marginal.

One or more deployable sheet material systems described herein may be configurable between a stowed configuration and a deployed configuration. When in the stowed configuration, the sheet material and other structure may be described as being stored into a relatively-compact space (e.g., the sheet material and other structure may "take up" less space than when in the deployed configuration). When in the deployed configuration, the sheet material may be extended to provide a large surface area (e.g., larger than when in the stowed configuration) and may be supported by the "truss"-based structure described herein.

The exemplary "truss"-based structure of the deployable sheet material systems may be described as helping evenly distribute resultant loads and decreasing the mass typically used (e.g., without using the "truss"-based structure) to support such resultant loads. In other words, the exemplary systems described herein may be able to support the same amount of sheet material as other systems by using structures having less mass than such other systems. Further, the exemplary deployable sheet material systems may also be described as increasing reliability by using the passive deployment of components and by distribution of internal loads.

Figure 1B:
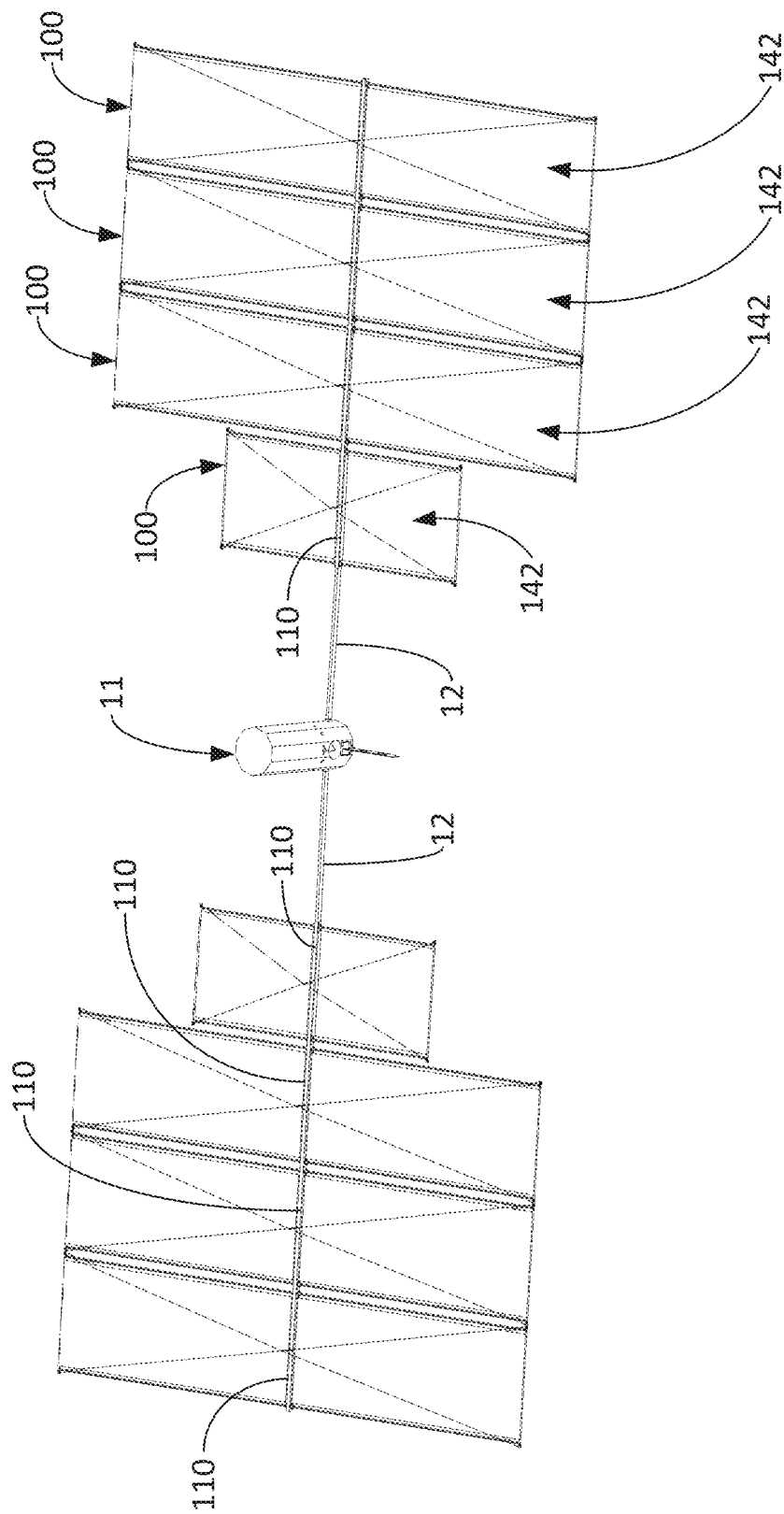
FIG. 1B is a perspective view of another plurality of exemplary deployable sheet material systems coupled to a spacecraft.
Figure 1C:
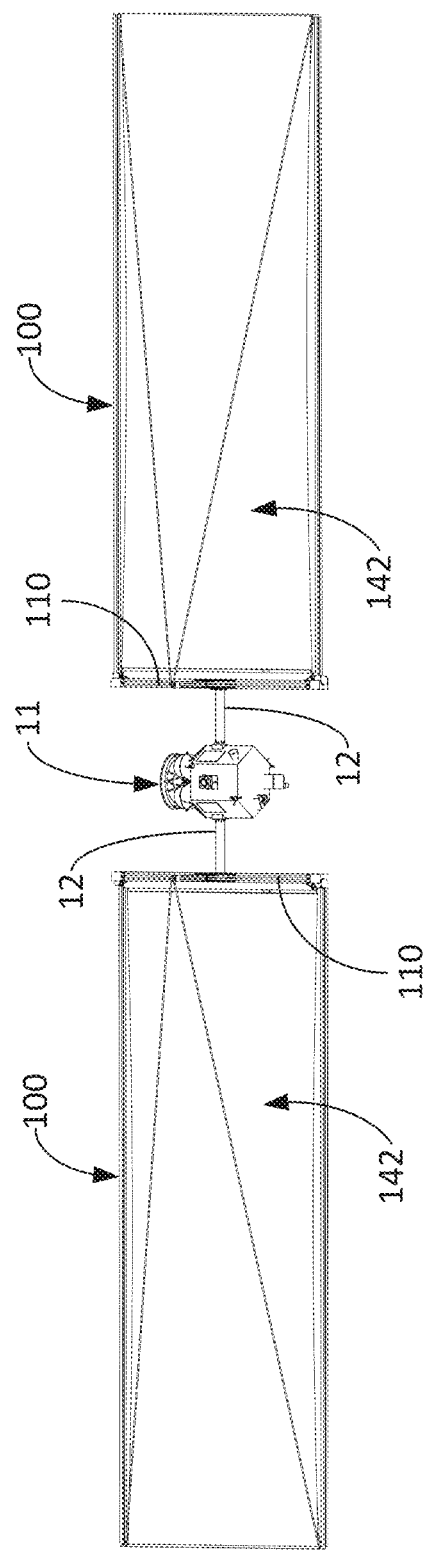
FIG. 1C is a perspective view of yet another plurality of exemplary deployable sheet material systems coupled to a spacecraft.

Various exemplary deployable sheet material systems 100 coupled to a spacecraft 11 and configured in a deployed configuration to deploy one or more portions of sheet material 142 (e.g., solar arrays, solar sails, drag structures, etc.) are shown in FIGS. 1A-1C. As shown, the exemplary deployable sheet material systems 100 may be arranged in various configurations which respect to the spacecraft 11. For example, as shown in FIG. 1A, four deployable sheet material systems 100 may be coupled to the spacecraft 11 on opposing sides from one another. As will be described further herein, each of the deployable sheet material systems 100 may be configured in a stowed configuration in close proximity to the spacecraft 11, and then may be configured to extend away from the spacecraft 11 into a deployed configuration to deploy the sheet material 142. Further, for example, as shown in FIG. 1B, multiple deployable sheet material systems 100 are coupled to the spacecraft 11 in series on either side of the spacecraft 11. In this embodiment, each of the deployable sheet material systems 100 may be configured in a stowed configuration in close proximity to the spacecraft 11, may be configured to extend (e.g., "fold out") from the spacecraft 11, and then may be further configured into a deployed configuration to deploy the sheet material 142. Still further, for example, as shown in FIG. 1C, two deployable sheet material systems 100 are coupled to opposing sides of the spacecraft 11 similar to the systems 100 of FIG. 1A.

The spacecraft 11 may include various spacecraft components and may be many different shapes and sizes. For example, the spacecraft 11 may include one or more spacecraft structures, propulsion systems, communications systems, avionics, thermal control systems, launch vehicle adapters, payloads (telecommunications systems, science instruments, etc.), etc. As shown in FIGS. 1A-1C, the exemplary deployable sheet material systems 100 may be coupled to the spacecraft 11 in a variety of different configurations. For example, the deployable sheet material systems 100 may release (e.g., fold, slide, extend, etc.) outward from the spacecraft 11 before deploying sheet material 142 (e.g., solar arrays, solar sails, etc.) into a deployed configuration.

Figure 2:
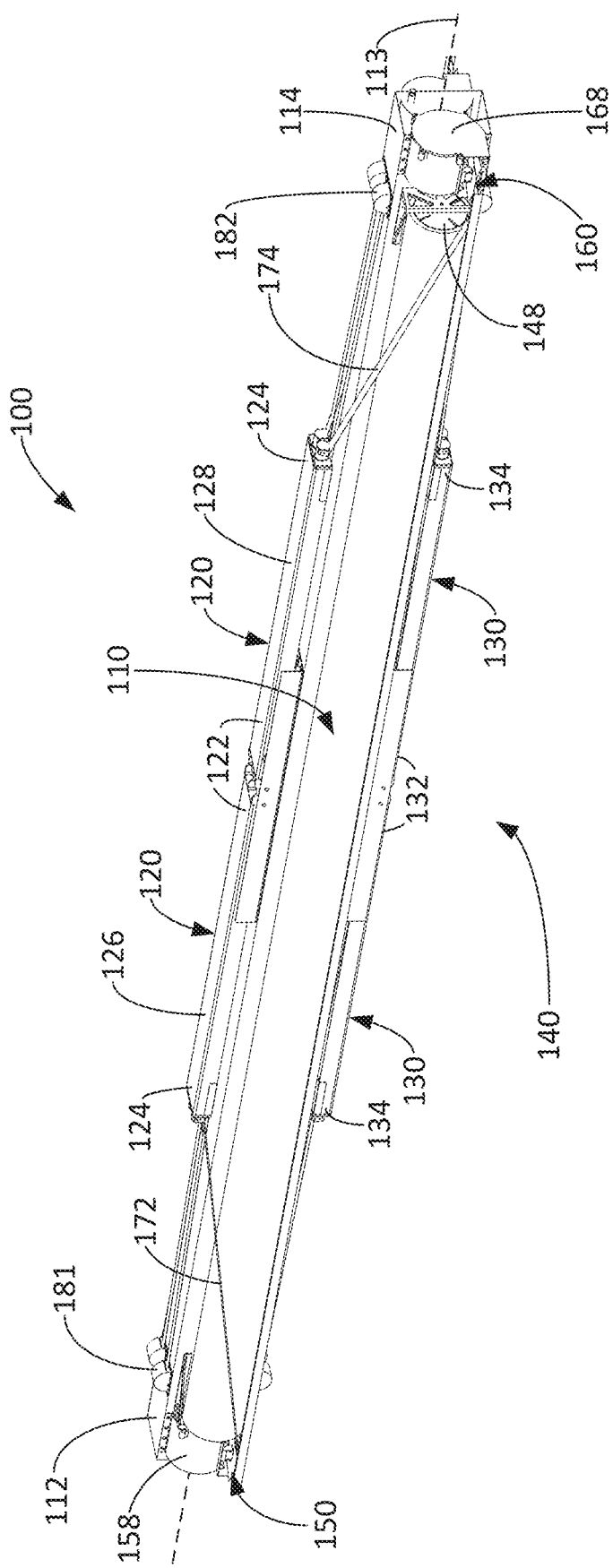
FIG. 2 is a perspective view of an exemplary deployable sheet material system in a stowed configuration.
Figure 4:
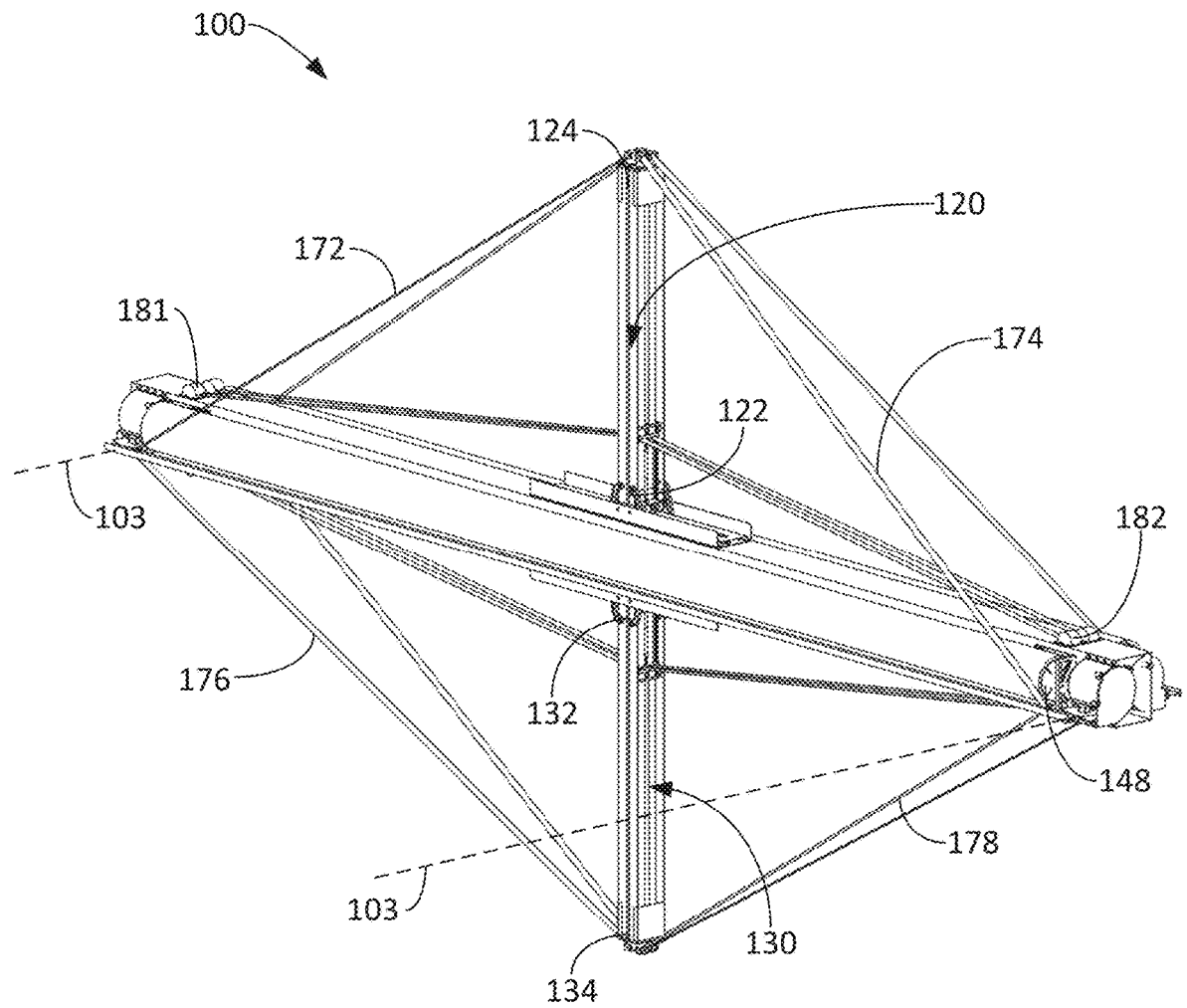
FIG. 4 is a perspective view of the exemplary deployable sheet material system of FIG. 2 when between the stowed configuration and a deployed configuration.
Figure 5:
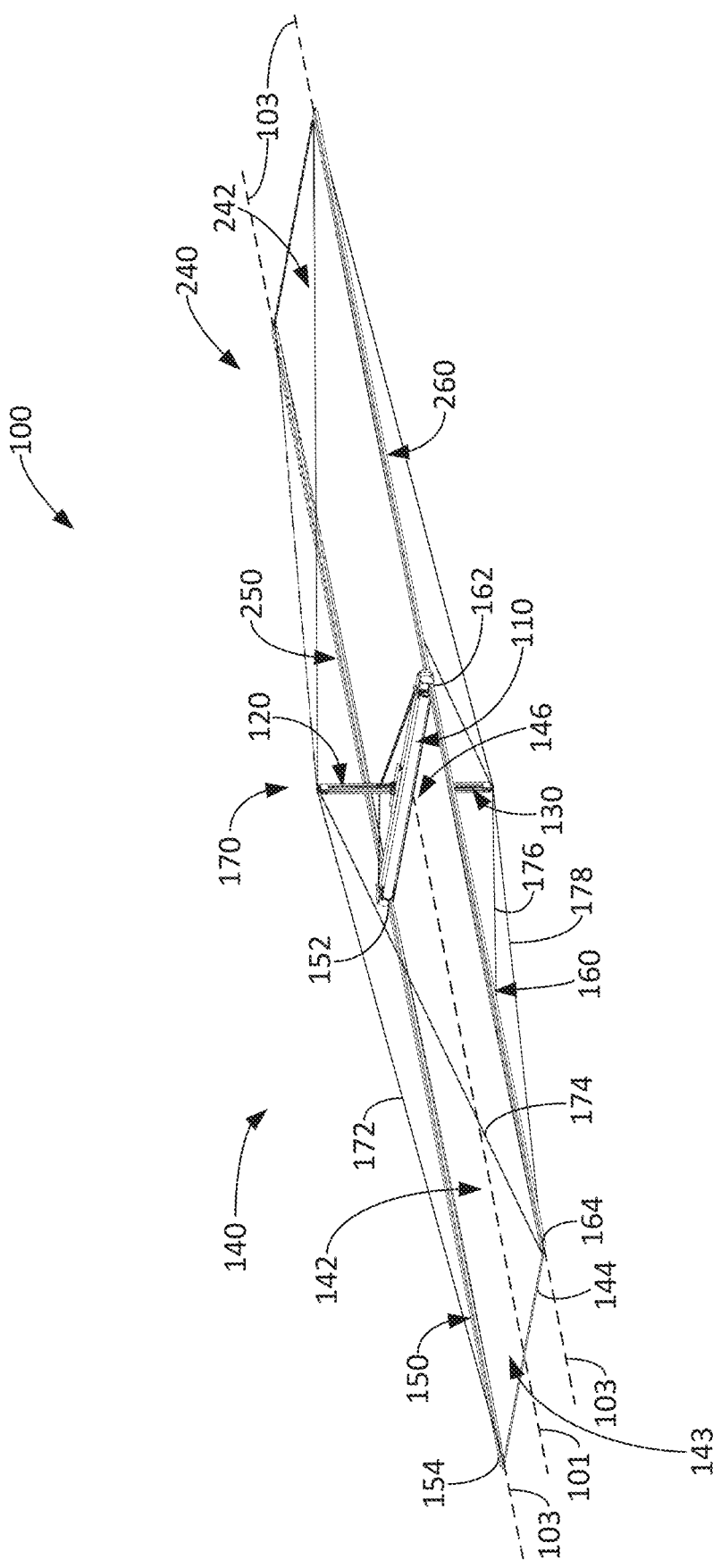
FIG. 5 is a perspective view of the exemplary deployable sheet material system of FIG. 2 when in the deployed configuration.

The deployable sheet material systems 100 may be configurable between a stowed configuration as shown in FIG. 2 and a deployed configuration as shown in FIG. 5. FIG. 4 illustrates the deployable sheet material system 100 between the stowed configuration and the deployed configuration. The deployable sheet material system 100 may be configured into the stowed configuration to reduce the size and profile of the deployable sheet material system 100, e.g., during transportation. The deployable sheet material systems 100 may be configured into the deployed configuration to deploy the sheet material 142 of the systems 100 (e.g., extend the surface area of the sheet material 142). In one or more of the embodiments, the system 100 may include one or more electro-mechanical actuators (e.g., shape-memory alloy, paraffin, pyro-technic, burn wire, etc.) configured to initiate movement of the deployable sheet material systems 100 from the stowed configuration to the deployed configuration as will be described further herein.

Generally, the exemplary deployable sheet material systems described herein include apparatus configured to stow and deploy one or more portions of the sheet material such as a photovoltaic array. One such exemplary deployable sheet material system 100 and parts, or portions, thereof is depicted in FIGS. 2-9. The exemplary deployable sheet material system 100 may include a primary beam member 110 (e.g., a trunk beam, a composite trunk, a primary structure, a housing, etc.) that extends from a first end region 112 to a second end region 114 (e.g., from a first end to a second end, from a location proximate the first end to a location proximate the second end, etc.) along an axis 113.

The primary beam member 110 may be coupled to the spacecraft 11 such that the primary beam member 110 is spaced away from the spacecraft 11. In one or more embodiments, for example, as shown in FIG. 1A, the primary beam member 110 may be coupled to and spaced away from the spacecraft 11 through an intermediate coupling member 12. In one or more embodiments, for example, as shown in FIG. 1B, multiple primary beam members 110, each part of, or corresponding to, an independent deployable sheet material system 100, may be coupled to each other and the primary beam members 110 may be configured to fold with respect to each another to reduce the profile of the deployable sheet material systems 100 when in the stowed configuration. As shown in FIGS. 1A-1C, the axis 113 (as shown in FIG. 2) of, or defined by, the primary beam member 110 may be parallel or perpendicular to the intermediate coupling members 12 when deployed or spaced away from the spacecraft 11. The primary beam member 110 may be described as defining the structure to which other components of the deployable sheet material system 100 are coupled to, which, thereby, may be described as coupling the other components of the deployable sheet material system 100 to the spacecraft 11 or other base system.

The exemplary deployable sheet material system 100 may further include one or more masts coupled to the primary beam member 110 that are configured to extend from the primary beam member 110 to locate, or position, one or more guy wires that will be used to stabilize the sheet material 142 as described further herein. As shown in the embodiment depicted in FIGS. 2-9, the exemplary deployable sheet material system 100 includes a first mast 120 coupled to the primary beam member 110 and a second mast 130 coupled to the primary beam member 110 opposite the first mast 120. The first and second masts 120, 130 may be described as being "mirrored structures" of each other because, e.g., the first and second masts 120, 130 are located on and extend from either side, or opposite sides, of the primary beam member 110 as shown in FIG. 4. The primary beam member 110, the first and second masts 120, 130, and/or portions thereof, may include (e.g., be formed of, etc.) one or more materials such as, e.g., carbon fiber reinforced plastic, steel, aluminum, titanium, composite, etc.

Each of the first and second masts 120, 130 may extend from a proximal region 122, 132 coupled to the primary beam member 110 to a distal region 124, 134. Each of the first and second masts 120, 130 may be coupled to the primary beam member 110 at, or proximate, the proximal regions 122, 132 of the corresponding first and second masts 120, 130. Although two masts are included in the embodiment depicted, other embodiments may include a single mast or more than two masts.

The first and second masts 120, 130 may be coupled to the primary beam member 110 between the first end region 112 and the second end region 114 of the primary beam member 110. As shown in FIG. 4, each of the first and second masts 120, 130 are coupled to the primary beam member 110 about halfway (e.g., proximate a center region) between the first end region 112 and the second end region 114 of the primary beam member 110. In one or more embodiments, the first and second masts 120, 130 may be coupled closer to the first end region 112 than the second end region 114 or closer to the second end region 114 than the first end region 112. In one or more embodiments, the first and second masts 120, 130 may be coupled to the primary beam member 110 directly opposite each other (e.g., on opposite sides of the primary member 110). In other embodiments, the first and second masts 120, 130 may be coupled to the primary beam member 110 offset from each other (e.g., not directly opposite one another on the primary beam member 110).

As described herein, the exemplary deployable sheet material systems 100 may be configured in a stowed configuration where the sheet material 142 is in storage, and in a deployed configuration, where the sheet material 142 is deployed (e.g., extended, unfurled, unrolled, unspooled, etc.) for use thereof. Likewise, the first and second masts 120, 130 may be configured in the stowed and deployed configurations. More specifically, as shown, the first and second masts 120, 130 are stowed in FIG. 2 and are deployed in FIG. 4.

To allow movement from the stowed configuration to the deployed configuration, the proximal regions 122, 132 of the first and second masts 120, 130 may be movably coupled (e.g., pivotally coupled, rotatably coupled, etc.) to the primary beam member 110. For example, the first and second masts 120, 130 may pivot, or move, about the proximal regions 122, 132 such that the distal regions 124, 134 pivots, or moves, away from the primary beam member 110. For example, when in the stowed configuration as shown in FIG. 2, each of the first and second masts 120, 130 may be stored proximate (e.g., extending along, adjacent to, next to, within, etc.) the primary beam member 110. In this example, the first and second masts 120, 130 may be folded adjacent the primary beam member 110 (e.g., parallel to the primary beam member axis 113). When in the deployed configuration as shown in FIG. 4, each of the first and second masts 120, 130 may have been moved, or pivoted, such that the first and second masts 120, 130 extend away from the primary beam member 110. In this example, the first and second masts 120, 130 may be unfolded to extend away from the primary beam member 110 orthogonally away from the primary beam member axis 113. In other words, the first and second masts 120, 130 may move relative to the primary beam member 110 when transitioning from the stowed configuration to the deployed configuration. In one or more embodiments, the first and second masts 120, 130 may move into position in the deployed configuration as shown in FIG. 4 before the rest of the system 100 is completely configured into the deployed configuration as shown in FIG. 5. Further, the distal regions 124, 134 of each of the first and second masts 120, 130 may be described as being located farther away from the primary beam member 110 when in the deployed configuration as shown in FIGS. 4-5 than when in the stowed configuration as shown in FIG. 2.

Figure 8:
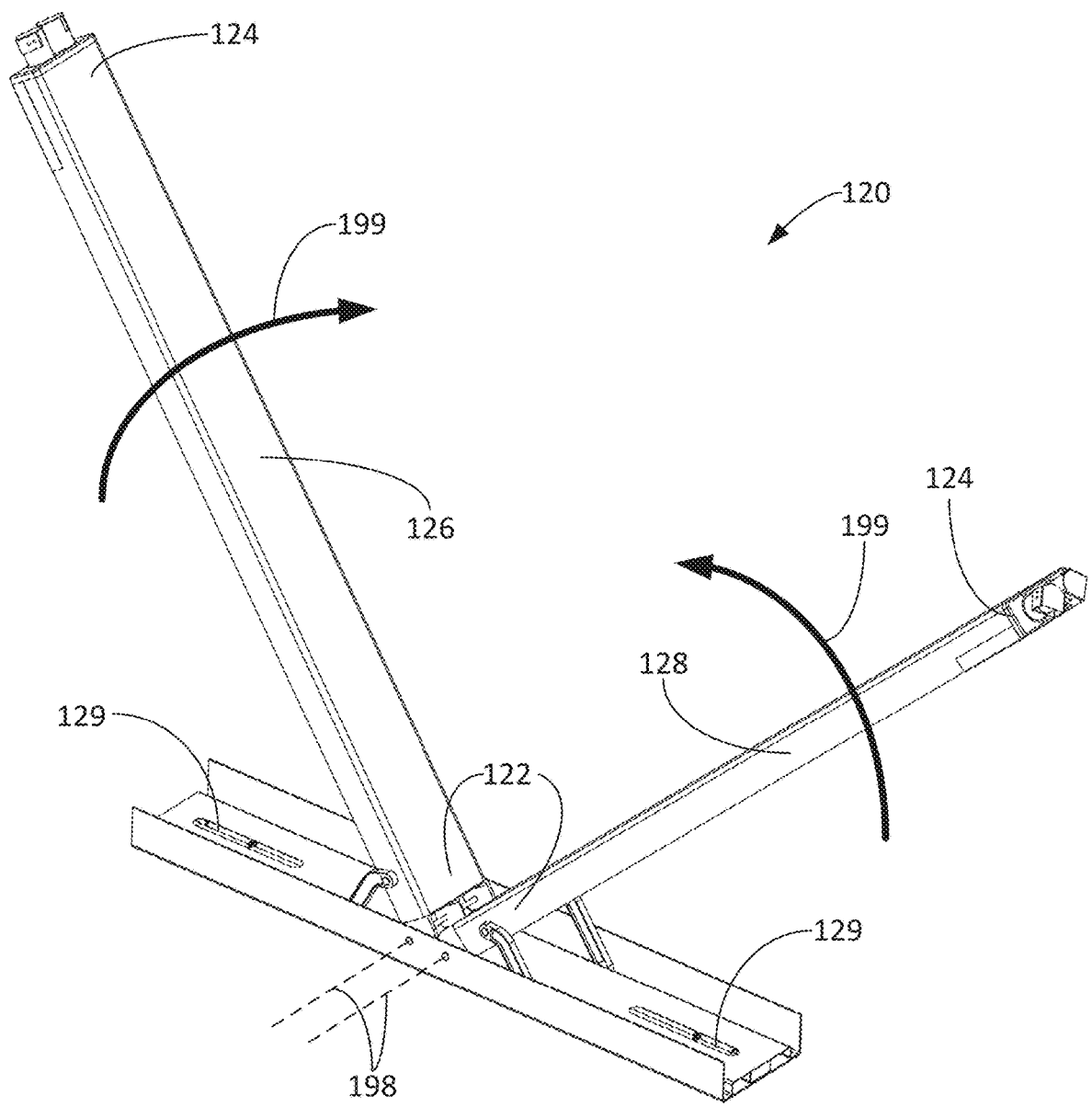
FIG. 8 is a perspective view of an exemplary mast of the deployable sheet material system of FIGS. 2-7 between a stowed configuration and deployed configuration.
Figure 9:
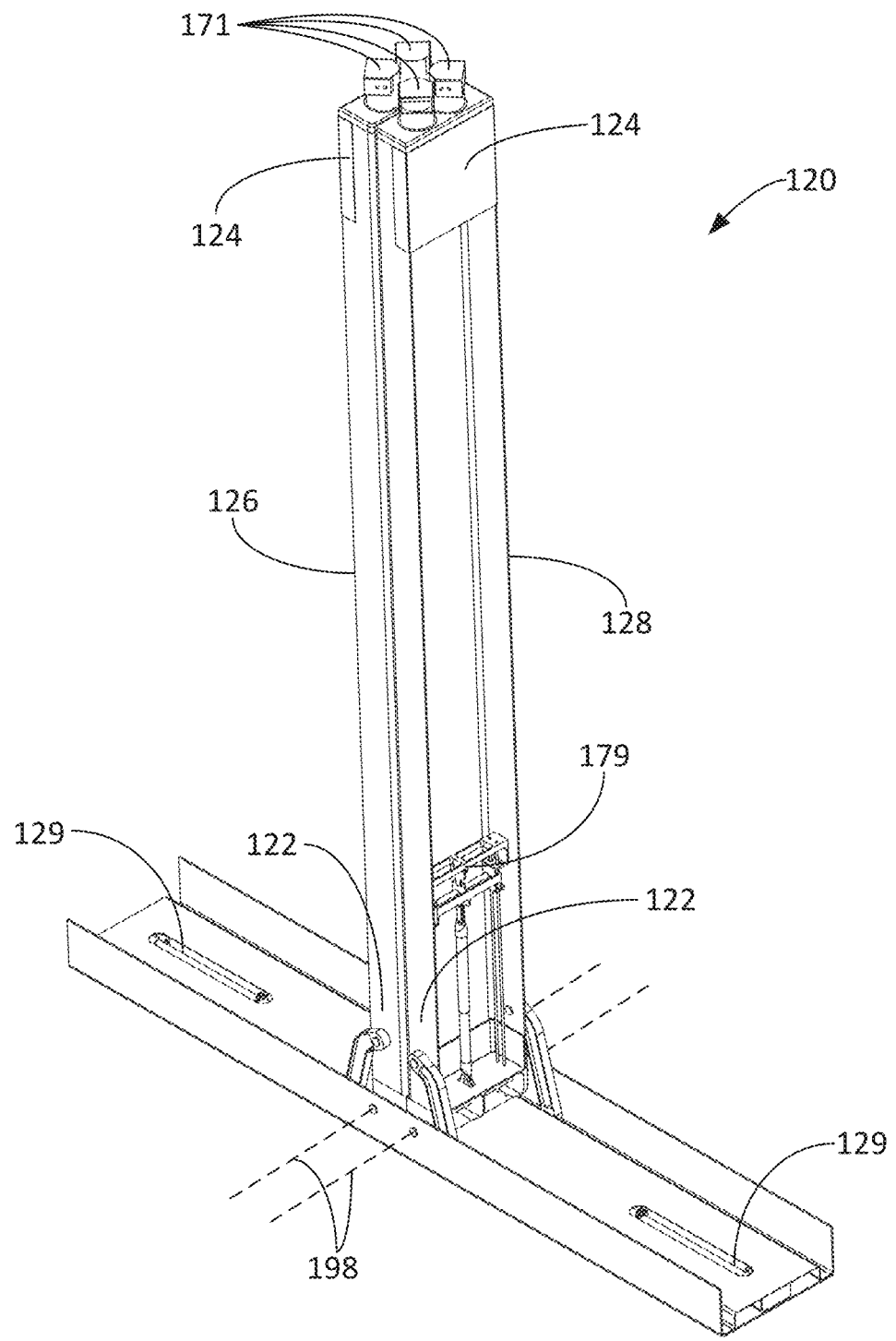
FIG. 9 is a perspective view of the exemplary mast of FIG. 8 when in the deployed configuration.

The first and second masts 120, 130 may include one or more portions that may interoperate together to form, or define, the first and second masts 120, 130. For example, in the embodiment depicted in FIGS. 2-9, each of the first and second masts 120, 130 include two portions, which will be described in more detail with respect to FIGS. 8-9. As shown, the first mast 120 may include a first mast portion 126 and a second mast portion 128. In FIG. 8, the first and second mast portions 126, 128 are transitioning from the stowed configuration to the deployed configuration by moving as indicated by arrows 199 about pivot axes 198. In FIG. 9, the first and second mast portions 126, 128 are positioned, or configured, in the deployed configuration. For example, each of the first and second mast portions 126, 128 have completely pivoted about the pivot axes 198 such that the first and second mast portion 126, 128 are moved proximate one another and extending substantially orthogonally from the primary beam member axis 113.

It may be described that each of the first and second mast portions 126, 128 may form, define, or be part of, the proximal and distal regions 122, 124 of the first mast 120.

For example, each of the first and second mast portions 126, 128 may define, form, or be part of, the proximal region 122 and the distal region 124. More specifically, the proximal region 122 of each of the first and second mast portions 126, 128 may be movable coupled (e.g., pivotally coupled, rotatably coupled, etc.) to the primary beam member 110 and the distal region 124 of each of the first and second mast portions 126, 128 may not be coupled to the primary beam member 110 so as to be able to be moved into the deployed configuration. Although not further described herein, it is be understood that the second mast 130 and any other mast of the exemplary systems may also include first and second mast portions similar to those described with regards to the first mast 120.

In one or more embodiments, the first and second masts 120, 130 may be biased to move relative to the primary beam member 110 from the stowed configuration shown in FIG. 2 to the deployed configuration as shown in FIG. 4. In other words, the first and second masts 120, 130 may be predisposed to extend in the position as shown in FIG. 4, but are held in place, or restricted from movement, until released. Still, in other words, the exemplary deployable sheet material system 100 may be described as storing potential energy that is configured to move the first and second masts 120, 130 from the stowed configuration to the deployed configuration. The potential energy may be restricted from being released by one or more portions or apparatus of the exemplary system 100. For example, the exemplary system 100 may include one or more mast actuators 129 configurable to release the first and second masts 120, 130 such that the distal regions 124 of the first and second masts 120, 130 may move from being proximate the primary beam member 110 to a distance away from the primary beam member 110 (e.g., extending orthogonally from the primary beam member 110) into a deployed configuration. The biasing element, which is the element that is configured to bias, or predispose the first and second masts 120, 130 into the deployed configuration, may include one or more elastic materials such as, e.g., metallic springs, composite springs, shape memory alloy structures, etc.

As described, in the embodiment depicted in FIGS. 2-9, each of the first and second mast portions 126, 128 may be biased to move from the stowed configuration to the deployed configuration. For example, as shown in FIG. 8, each of the first and second mast portion 126, 128 has been released from the stowed configuration and are pivoting about the pivot axes 198 proximate the proximal regions 122 toward the deployed configuration as indicated by arrows 199. In FIG. 9, the first and second mast portion 126, 128 of the first mast 120 have come together, or joined, to define the first mast 120 in the deployed configuration. When the first mast 120 is deployed, it may be described that the potential energy has been expended to move the first mast 120 into the deployed configuration. Further, in one or more embodiments, at least some energy may still be acting on the first mast 120 and/or portions thereof 126, 128 to maintain the first mast 120 configured into the deployed configuration (e.g., extending orthogonally to the primary beam member axis 113).

The exemplary deployable sheet material system 100 may further include a plurality of guy wire mast pivots 171 coupled to the distal regions 124 of the masts that are configured to receive and direct guy wires for supporting and stabilizing the sheet material 142 as will be further described herein.

The exemplary deployable apparatus 140 of the deployable sheet material system 100 may be described as one or more portions, or pieces, of apparatus and/or structures configured to move the sheet material 142 away from primary beam member 110 towards, and ultimately to, the deployed configuration. The deployable apparatus 140 may be described in terms of the various types of motions, or movement, the deployable apparatus 140 may perform when deploying the sheet material 142. For example, the deployable apparatus 140 may be described as rollable apparatus, spoolable apparatus (i.e., configured to be spooled/unspooled), foldable apparatus, accordion shaped apparatus, winglets, compressible apparatus, etc. In other words, the deployable apparatus 140 may extend in a variety of different ways such as, e.g., rolling, folding, accordion-like, sliding, etc. In the exemplary deployable sheet material system 100 depicted and described with reference to FIGS. 2-9, the deployable apparatus 140 may be described as spoolable apparatus because, e.g., the apparatus, or at least many parts, or portions, thereof may be spooled (e.g., placed or configured into a spooled state) when in the stowed configuration.

The exemplary deployable apparatus 140 of the deployable sheet material system 100 may be coupled to the primary beam member 110 and may be configured such that at least a portion of the deployable apparatus 140 extends away from the primary beam member 110 to position and support the sheet material 142 in an extended, substantially planar status, which in at least one example, is configured to collect solar energy. The deployable apparatus 140 may include a sheet material spool 148 (e.g., mandrel, spindle, reel, shaft, etc.) from which the sheet material 142 extends. For example, the sheet material 142 may be rolled-up or wound-up on the sheet material spool 148 such that increasing portions of the sheet material 142 may be configured to extend, or disperse, from the sheet material spool 148 while the sheet material spool 148 remains in place (e.g., similar to a carpenter's tape) while any remaining portion of the sheet material 142 remains rolled-up on the sheet material spool 148. The sheet material spool 148 may be coupled to the primary beam member 110 such that, e.g., the sheet material spool 148 may not move relative to the primary beam member 110. In other words, a portion of the sheet material 142 may move relative to and extend away from the primary beam member 110 while the sheet material spool 148 remains stationary proximate the primary beam member 110. In contrast, other systems may include a spool that that extends away from (e.g., moves relative to) a primary beam member to dispose sheet material while the spool moves, or rolls, away from the primary beam member. Anchoring or affixing the sheet material spool 148 relative to the primary beam member 110 may avoid the complexity attributed to having to move the sheet material spool 148 as would be the case in systems in which the spool moves, or rolls, away from the primary beam member 110. Anchoring or affixing the sheet material spool 148 to the primary beam member 110 may also improve the first vibration mode of the system 100 by minimizing the amount of mass far from the primary beam member 110.

In the embodiment depicted, the deployable apparatus 140 may include a first boom member 150 proximate the first end region 112 of the primary beam member 110, a second boom member 160 proximate the second end region 114 of the primary beam member 110, and sheet material 142 located between the first boom member 150 and the second boom member 160. Each of the first and second boom members 150, 160 may be configured to extend from the primary beam member 110 parallel to an extension axis 101, which is perpendicular to the primary beam member axis 113, to deploy the sheet material 142 when in the deployed configuration as shown in FIG. 5. When in the stowed configuration, the first and second boom members 150, 160 may be stowed or stored (e.g., "rolled up," spooled, constrained, contained, etc.) proximate the primary beam member 110 as shown in FIG. 4.

More specifically, each of the first and second boom members 150, 160 may extend from a proximal boom region 152, 162 coupled to the primary beam member 110 to a distal boom region 154, 164, respectively. When in the deployed state, the first and second boom members 150, 160 may be configured to extend away from the primary beam member 110 with the proximal boom regions 152, 162 remaining coupled and proximate to the primary beam member 110. For example, it may be described that the distal boom regions 154, 164 of the first and second boom members 150, 160 are positioned closer to the primary beam member 110 when in the stowed configuration than when in the deployed and extended configuration.

As shown in FIGS. 2-6, the deployable sheet material system 100 may include a first boom member housing 158 located proximate and coupled to the first end region 112 of the primary beam member 110 and a second boom member housing 168 located proximate and coupled to the second end region 114 of the primary beam member 110. The first and second boom member housings 158, 168 may be configured to store at least a portion, or all, of the first and second boom member 150, 160, respectively, when in the stowed configuration. In one or more embodiments, each of the first and second boom member housings 158, 168 may include a spool that is configured to "spool" the first and second boom members 150, 160 when in the stowed configuration. The first and second boom members 150, 160 may be configured to be unrolled, unspooled, or unfurled, away from the first and second boom member housings 158, 168 when configured in the deployed configuration.

Figure 3:
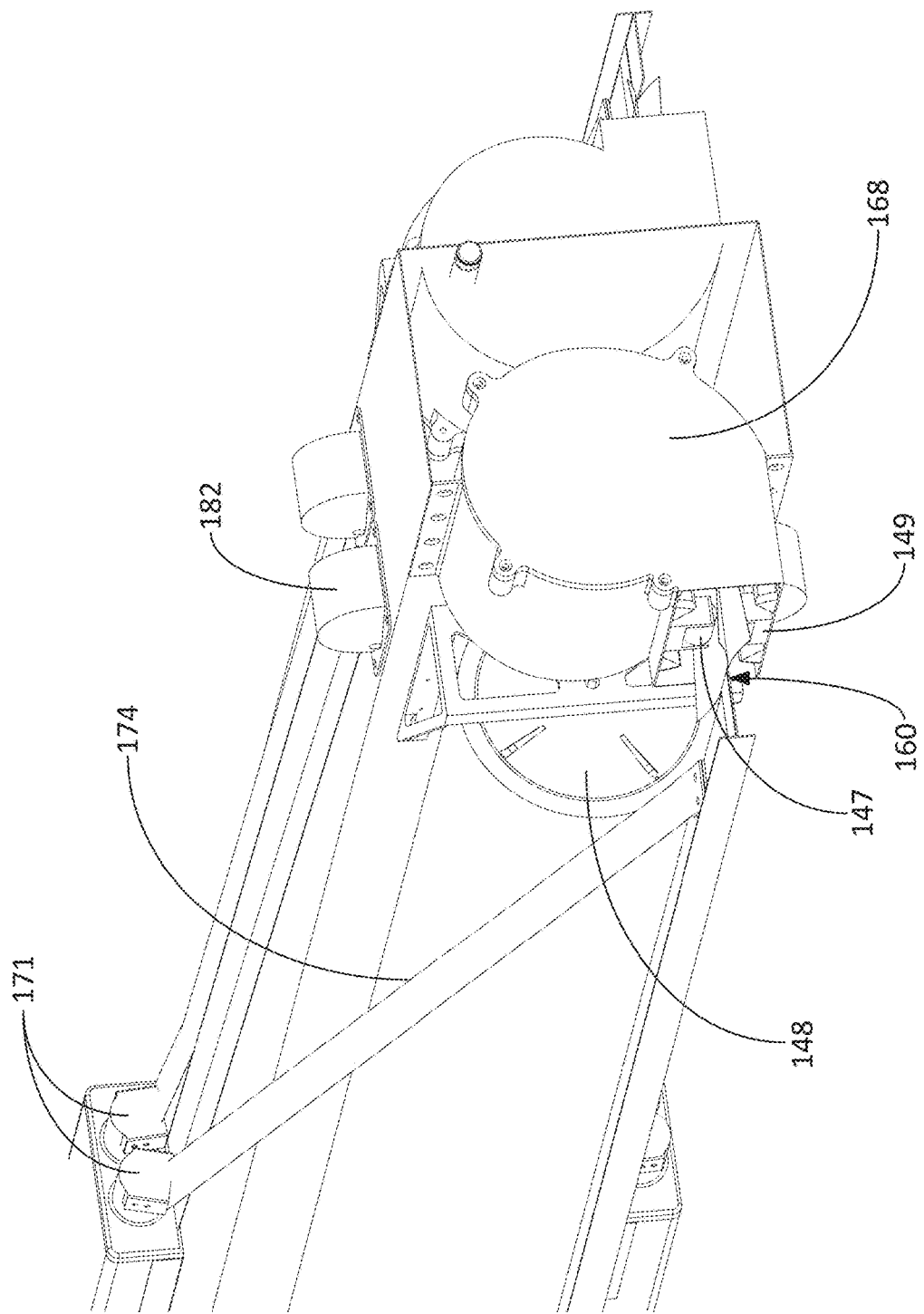
FIG. 3 is an expanded perspective view of an end portion of the exemplary deployable sheet material system of FIG. 2.
Figure 6:
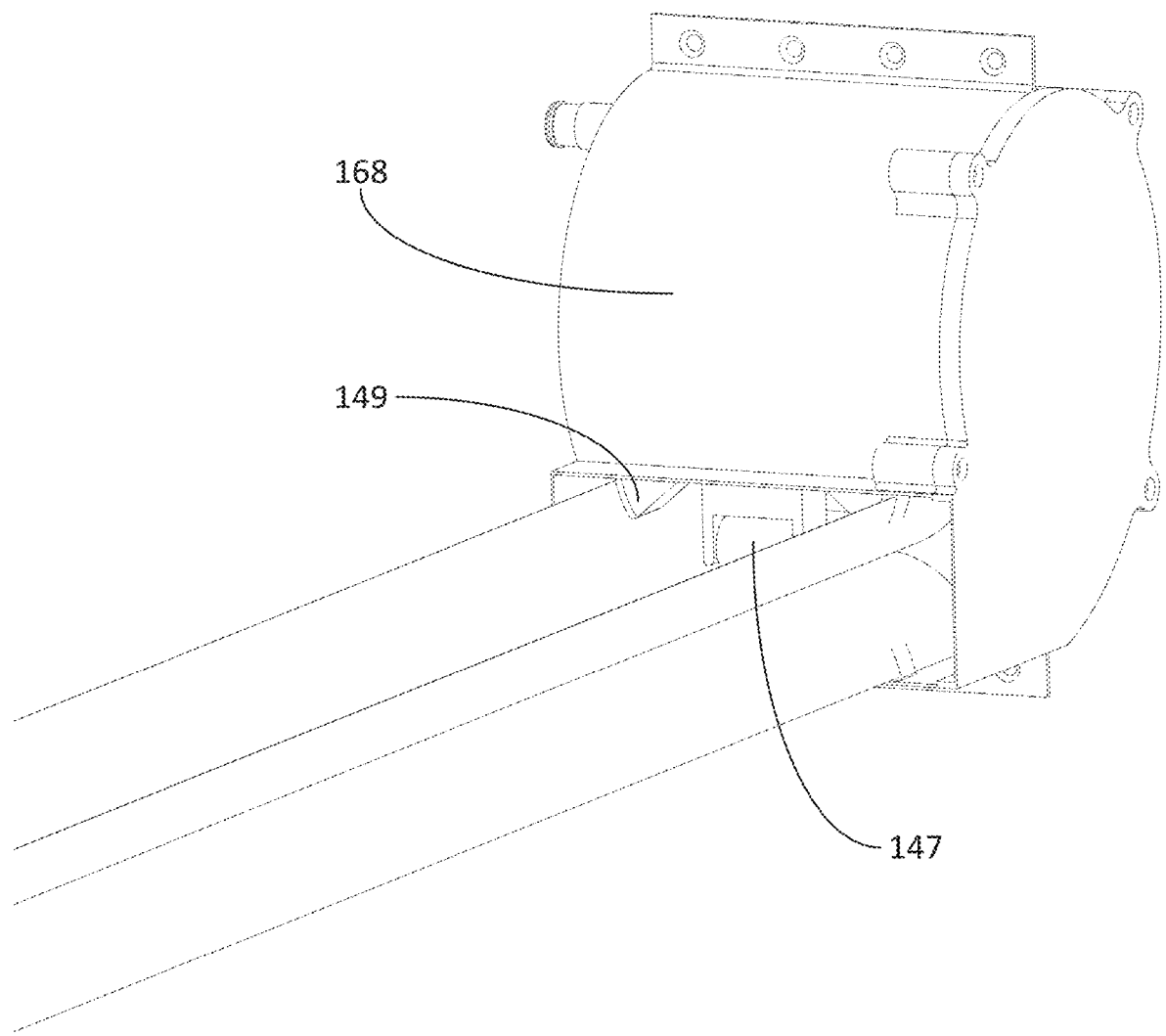
FIG. 6 is a perspective view of an exemplary boom member housing and a portion of an exemplary boom of the deployable sheet material system of FIGS. 2-5.

In one or more embodiments, the first and second boom members 150, 160 may be biased to extend parallel to the extension axis 101 into the deployment configuration. In other words, the first and second boom members 150, 160 may be predisposed to be configured in an extended state (e.g., to move outward from the primary beam member 110) extending along boom axes 103. In one or more embodiments, the system 100 may include a deployable (e.g., rollable, spoolable, etc.) apparatus actuator 149 that is configurable to release the deployable apparatus 140 (e.g., the first and second boom members 150, 160) as shown in FIGS. 3 and 6. In other words, the deployable apparatus actuator 149 (e.g., a solenoid) may release the boom member 150, 160 such that the boom member 150, 160 extends from the first and second boom member housings 158, 168 (e.g., extending parallel to the extension axis 101 to deploy along the boom axes 103) without additional forces (e.g., passively).

In the embodiment depicted in FIGS. 2-9, each of the first and second boom members 150, 160 may themselves be biased, or predisposed, into the deployed configuration, and as such, may be elastically deformed when in the stowed configuration. The strain energy thus stored through elastic deformation may be contributed in part by the shape of the cross-section of the boom members 150, 160. More specifically, the first and second boom members 150, 160 may include (e.g., be formed of) two or more lenticular springs that may be configured, or oriented, such that the convex surfaces face each other. Additionally, the concave surfaces of each lenticular spring may face away (e.g., in an opposing direction), at least in part, from each other. In at least one embodiment, the two lenticular springs of the first and second boom members 150, 160 may further be connected along a central region (e.g., the central region may be located between the first and second longitudinal edges regions of the two lenticular springs). Similar exemplary lenticular springs may be described in U.S. Pat. App. Pub. No. 2014/0042275 A1 filed on Aug. 9, 2013 and entitled "Gossamer Apparatus and Systems for Use with Spacecraft" and U.S. Pat. App. Pub. No. 2016/0122041 A1 filed on Oct. 8, 2015 and entitled "Extendable Solar Array," both of which are incorporated herein by reference in their entireties.

It may be described that the first and second boom members 150, 160 may be configured to store potential energy when the deployable sheet material system 100 is configured in the stowed configuration. The stored potential energy of the first and second boom members 150, 160 may provide the movement of the deployable apparatus 140 from the stowed configuration to the deployed configuration when released. More specifically, for example, the lenticular springs of the first and second boom members 150, 160 may store the potential energy and, when released, generate forces to straighten the first and second boom members 150, 160 to extend along boom member axes 103 (e.g., the way a carpenter's tape naturally straightens itself out). When bent, or wrapped about the spools of the beam member housings 158, 168, the lenticular springs of the first and second boom members 150, 160 may store potential energy, which may be subsequently expended, or "spent," to straighten out the lenticular springs during the transition from the stowed configuration, or state, to the deployed configuration, or state. The lenticular springs of the first and second boom members 150, 160 may be selected and/or configured so as to generate a sufficient force for deploying the deployable apparatus 140 (e.g., to deploy the deployable apparatus 140 in a passive manner based on the first and second boom members 150, 160 own potential energy without the aid or addition of energy from other components such as a motor). In other embodiments, however, the first and second boom members 150, 160 may extend from the first and second boom member housings 158, 168 using, e.g., a motor or any other suitable type of active deployment apparatus.

Additionally, as shown, each of the first and second boom member housings 158, 168 may include one or more rollers 147 configured to guide the first or second boom members 150, 160 away from the primary beam member 110.

Figure 7:
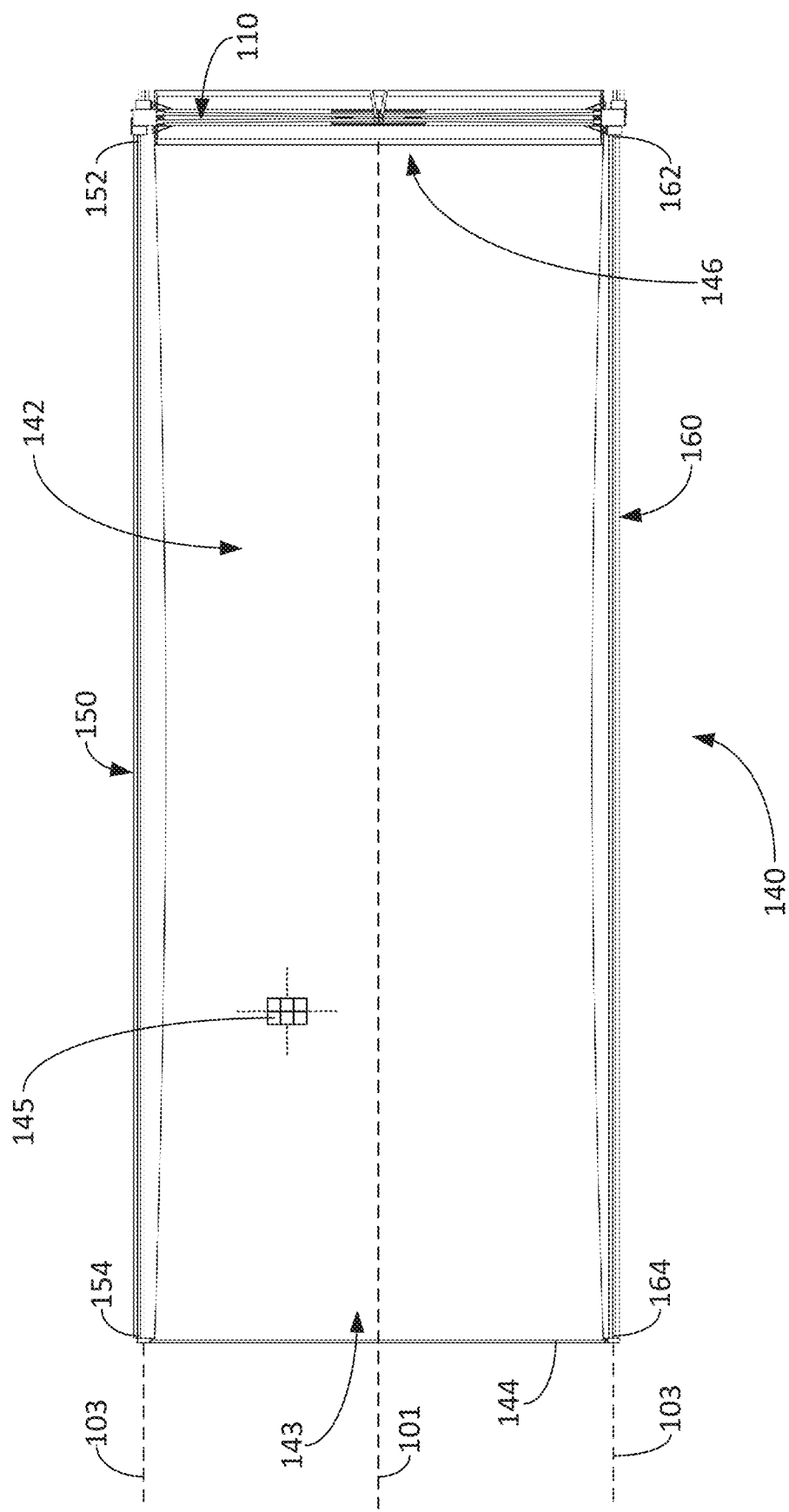
FIG. 7 is a top plan view of the exemplary deployable sheet material system of FIGS. 2-6 when in the deployed configuration as shown in FIG. 5.

As previously described herein, the deployable apparatus 140 also includes the sheet material 142 (e.g., one or more photovoltaic arrays, solar shield, solar sail, etc.) located between the first and second boom members 150, 160 and an end beam 144 as shown in FIGS. 5 and 7. The end beam 144 may extend from the first boom member 150 to the second boom member 160 and may be coupled to each of the distal regions 154, 164 of the first and second boom members 150, 160.

As shown in FIG. 7, the sheet material 142 or the portion of sheet material 142 may be described as extending from a distal sheet region 143 to a proximal sheet region 146. The proximal sheet region 146 may be located proximate to, and possibly coupled to, the primary beam member 110. For example, the proximal sheet region 146 of the sheet material 142 may be coupled to the primary beam member 110 through one or more elastic members (e.g., proximate the first and second end regions 112, 114). In other embodiments, the proximal sheet region 146 of the sheet material 142 may be directly coupled to the primary beam member 110. The distal sheet region 143 may be located away from the primary beam member 110 when in the deployed configuration as shown in FIGS. 5 and 7. When the sheet material 142 is configured in the stowed configuration such as, e.g., "rolled up" or "spooled up" proximate the primary beam member 110, both of the distal and proximal sheet regions 143, 146 of the sheet material 142 are proximate the primary beam member 110.

The first and second boom members 150, 160 may be configured to deploy (e.g., extend, unwrap, unfurl, unspool, etc.) the sheet material 142 when the boom members 150, 160 are released to move into the deployed configuration extending along the boom axes 103. For example, the sheet material 142 may be coupled to the first and second boom members 150, 160 at one or more locations and/or through one or more other portions or apparatus of the deployable apparatus 140. For example, as shown, the sheet material 142 may not be directly coupled to the first or second boom members 150, 160. Instead, the distal end region 143 of the sheet material 142 may be coupled to the end beam 144 and the end beam 144 may be coupled to each of the first and second boom members 150, 160. As such, in one or more embodiments, there may be a gap between the sheet material 142 and each of the first and second boom members 150, 160 as shown in FIG. 7. In other embodiments, the distal end region 144 or other side regions of the sheet material 142 may be coupled to the first and second boom members 150, 160. No matter how the sheet material 142 is coupled to the first and second boom members 150, 160 (e.g., coupled directly thereto, coupled through other parts, portions, or apparatus, etc.), when the boom members 150, 160 are spooled out or extended to an extended state when moving into the deployed configuration, the sheet material 142 may also move along with the first and second boom members 150, 160 into the deployed configuration.

As described herein, in one or more embodiments, the sheet material 142 may include one or more solar arrays 145 (e.g., one or more photovoltaic arrays) disposed thereon as shown in FIG. 7. For example, in one or more of the embodiments, the sheet material 142 may include a thin-film photovoltaic material (e.g., amorphous silicon, copper indium gallium selenide, inverted metamorphic multi-junction, cadmium telluride, organic photovoltaics, etc.) and/or a crystalline photovoltaic material (e.g., crystalline silicon, multi junction crystalline, gallium arsenide, etc.). In one or more of the embodiments, the sheet material 142 (e.g., thin-film photovoltaic material, crystalline photovoltaic material, etc.) may be combined with additional materials in layers (e.g., scrim cloth, glass, polyimide films, adhesives, encapsulations, circuit wiring, etc.) to form a solar array blanket assembly that may be configured to perform mechanical functions (e.g., blanket tensioning) and electrical functions (e.g., power transfer to the system or spacecraft).

In one or more embodiments, the sheet material 142 may be in tension when in the deployed configuration. Tension on the sheet material 142 may be achieved by the geometry of the sheet, such that the fully deployed boom members 150, 160 place the sheet material 142 in tension by pushing on the end beam 144 to which the sheet material 142 is coupled. In one or more embodiments, the sheet material 142 may be placed in tension by a sheet tensioning apparatus that may be housed within the primary beam member 110 or within the mandrel, or spindle, upon which the sheet material 142 is stored when in the stowed configuration. In one or more embodiments, the sheet tensioning apparatus may apply tension to the sheet material 142 by using, e.g., springs, elastic materials, etc. The sheet tensioning apparatus may be engaged continuously, or only after the other system elements have reached the deployed configuration. Such activation of the sheet tensioning apparatus may be achieved using any suitable type of release actuator such as, e.g., shape-memory alloy, paraffin, pyro-technic, burn wire, etc.

The one or more solar arrays 145 may be flexible such that the one or more solar arrays 145 can be stowed and extended along with the sheet material 142 as the system 100 moves between the stowed configuration and the deployed configuration. For example, in one or more of the embodiments, the sheet material 142 (e.g., the solar array blanket assembly) may be pliable such that the sheet material 142 may be spooled into a spooled state, or configuration, when the deployable sheet material system 100 is in the stowed configuration and may be unrolled or unspooled into an extended state, or configuration, (e.g., planar configuration) when the deployable sheet material system 100 is in the deployed configuration.

In one or more of the embodiments, the sheet material 142 may include pliable sections that define fold lines such that the sheet material 142 may be folded into a prismatic shape (e.g. flattened accordion shape) when the deployable sheet material system 100 is in the stowed configuration and may be unfolded into a planar configuration when the deployable sheet material system 100 is in the deployed configuration. In one or more of the embodiments, the sheet material 142 may include a plurality of circuits that wire photovoltaic materials in a variety of series and parallel configurations to achieve desirable voltage and current parameters for the sheet material 142.

In one or more embodiments, the deployable sheet material system 100 may include an electrical system (e.g., wires, cables, circuit board, etc.) electrically coupled to the sheet material 142 (e.g., the one or more photovoltaic arrays) to, e.g., transfer or transmit solar-generated electricity from the sheet material 142 to an electrical storage system. The electrical system may also electrically couple the sheet material 142 to a harness that passes adjacent to (e.g., along, though, etc.) the primary beam member 110 (e.g., along primary beam member 110 from the first end region 112 to the second end region 114, proximate the first end region 112, proximate the second end region 114, between the first and second end regions 112, 114, etc.). The electrical system may also electrically connect the sheet material 142 to an additional component (e.g., module, housing, satellite portions, solar array drive assembly, diode board, etc.) at a location, e.g., proximate the first end region 112, proximate the second end region 114, between the first and second end regions 112, 114.

The deployable sheet material system 100 may also include a plurality of guy wires 170 (e.g., cables, tethers, etc.) to support and stabilize the deployable apparatus 140 when the deployable sheet material system 100 is in the deployed configuration as shown in FIG. 5. The plurality of guy wires 170 may be defined by various different configurations such as, e.g., a multi-stranded tether defined by a cross-strapped pattern. In other words, each of the plurality of guy wires 170 may include (e.g., be formed up) a plurality of strands.

Generally, the plurality of guy wires 170 may extend from a location outside of the plane defined boom axes 103 and the primary beam member axis 113 to any location of the structures or apparatus described herein so as to provide support and stability to the sheet material 142 when in the extended, deployed configuration. For example, the plurality of guy wires 170 may extend to one or more of the distal sheet region 143 of the sheet material 142, the end beam 144, and the distal boom regions 154, 164 from the location outside of the plane defined boom axes 103 and the primary beam member axis 113. As shown in this embodiment, the plurality of guy wires 170 may include a first guy wire 172 extending from at least the distal region 124 (e.g., the distal end) of the first mast 120 to the distal region 154 (e.g., the distal end) of the first boom member 150 and a second guy wire 174 extending from at least the distal region 124 (e.g., the distal end) of the first mast 120 to the distal region 164 (e.g., the distal end) of the second boom member 160. The plurality of guy wires 170 may also include a third guy wire 176 (e.g., the distal end) extending from at least the distal region 134 (e.g., the distal end) of the second mast 130 to the distal region 154 (e.g., the distal end) of the first boom member 150 and a fourth guy wire 178 extending from at least the distal region 134 (e.g., the distal end) of the second mast 130 to the distal region 164 (e.g., the distal end) of the second boom member 160. Additionally, although the guy wires 172, 174, 176, 178 are coupled to the distal regions 154, 164 of the first and second boom members 150, 160, the guy wires 172, 174, 176, 178 may be coupled to anywhere along the first and second boom members 150, 160.

The combination of one or more of the first boom member 150, the second boom member 160, the first mast 120, the second mast 130, the end beam 144, the primary beam member 110, the first guy wire 172, the second guy wire 174, the third guy wire 176, and the fourth guy wire 178 may be described as forming a truss structure. As a result, the internal member loads of each of those one or more elements above may be placed either substantially in compression or tension. For example, the plurality of guy wires 170 (e.g., first, second, third, fourth guy wires 172, 174, 176, 178) may be placed in tension while the one or more boom members (e.g., the first boom member 150, the second boom member 160) may be placed in compression to, e.g., stabilize and support the system 100. Specifically, tension applied to the plurality of guy wires 170 may apply compression to the one or more boom members, which is in contrast to systems that do not apply any compression to the one or more boom members (e.g., the boom members are free standing in such systems without guy wires or other devices to place booms in compression). Placing the one or more boom members in compression may provide a variety of different advantages such as, e.g., providing stability, rigidity, support, etc. to the system 100 that may not be present in systems including boom members that are not in compression.

Further, in one or more embodiments, one or more of the primary beam member 110, the first and second masts 120, 130, the first, second, third, and fourth guy wires 172, 174, 176, 178, the end beam 144, and the sheet material 142 may be described as forming a winglet structure. In one or more embodiments, a plurality of winglet structures may be arranged such that the sheet material 142 of each winglet may be in a planar configuration and may form a solar array wing (e.g., two winglets may form a wing). In one or more embodiments, the system may include a plurality of winglets (e.g., aligned along an axis, distributed along a mounting structure, etc.).

The exemplary deployable sheet material system 100 may include a first guy wire housing 181 (e.g., spool) configured to store (e.g., roll up, spool) at least a portion of the first guy wire 172 when in the stowed configuration as shown in FIG. 2 and a second guy wire housing 182 (e.g., spool) configured to store (e.g., roll up, spool) at least a portion of the second guy wire 174 when in the stowed configuration as shown in FIGS. 2 and 3. Each of the first and second guy wire housings 181, 182 may be located on the primary beam member 110 or the first mast 120 such that the first guy wire 172 and the second guy wire 174 may extend to the first and second boom members 150, 160, respectively, through the distal region 124 of the first mast 120. For example, in one or more embodiments, the first and second guy wire housings 181, 182 may be located at the distal region 124 of the first mast 120. Further, for example, as shown in FIGS. 2 and 3, the first guy wire housing 181 may be located proximate the first end region 112 of the primary beam member 110 and the second guy wire housing 182 may be located proximate the second end region 114 of the primary beam member 110. In one or more embodiments, the system 100 may include multiple guy wire housings to position and store a corresponding guy wire of the plurality of guy wires 170.

As shown in FIGS. 4-5, the first guy wire 172 may extend from the first end region 112 of the primary beam member 110 to the first boom member 150 through the distal region 124 of the first mast 120 and the second guy wire 174 may extend from the second end region 114 of the primary beam member 110 to the second boom member 160 through the distal region 124 of the first mast 120. The system 100 may include a plurality of guy wire mast pivots 171 positioned proximate the distal region 124 of the first mast 120 as shown in FIG. 9 that may be configured to guide one or more of the plurality of guy wires 170 from the first mast 120 to a corresponding boom member (e.g., the first or second boom members 150, 160) when the system 100 is moving between the stowed configuration and the deployed configuration. For example, the guy wire mast pivots 171 may move (e.g., pivot about an axis perpendicular to the primary beam axis 113) relative to the first mast 120 as the first and second boom members 150, 160 deploy (e.g., passively) with the sheet material 142.

In one or more embodiments, the deployable sheet material system 100 may further include one or more tensioners 179 as shown in FIG. 9 to place the plurality of guy wires 170 in tension. Placing the plurality of guy wires 170 in tension may help to form the truss-like structure with distributed internal loads. In one or more embodiments, the one or more tensioners 179 may be located proximate (e.g., attached to) the first or second mast 120, 130 through which the corresponding guy wire 170 passes. The tensioners 179 may be configured to be biased such that the tensioners 179 pull on the guy wire 170 until the guy wire 170 is taut.

In one or more embodiments, the deployable sheet material system 100 may include additional deployable apparatus 240 coupled to the primary beam member 110 opposite the deployable apparatus 140 (e.g., as shown in FIG. 5) and may be deployable opposite the deployable apparatus 140. The additional deployable apparatus 240 may be a mirrored structure of the deployable apparatus 140. For example, the additional deployable apparatus may include a third boom member 250 proximate the first end region 112 of the primary beam member 110 and fourth boom member 260 proximate the second end region 114 of the primary beam member 110. The additional deployable apparatus 240 may also include an additional sheet material 242 between the third boom member 250 and the fourth boom member 260. The additional deployable apparatus 240 may function in the same ways as described herein regarding the deployable apparatus 140.

In one or more embodiments, a control apparatus (e.g., one or more processors employing one or more programs or routines carrying out one or more methods or processes and implemented with one or more types of memory) may be configured to control the system and/or one or more elements thereof moving between the stowed configuration and the deployed configuration. In one or more embodiments, the control apparatus may be configured to control the deployable apparatus actuator 149 to release the deployable apparatus 140 and control a rate of deployment such that the deployable apparatus 140 deploys (e.g., passively) from the stowed configuration (e.g., spooled state) to the deployed configuration (e.g., extended state). In one or more embodiments, the control apparatus may be configured to control the mast actuator 129 to release the first mast 120 (or second mast 130) and control a rate of deployment such that the distal region 124 of the first mast 120 moves (e.g., passively) from proximate to the primary beam member 110 to a distance away from the primary beam member 110.

The methods and/or logic and/or configurations described in this disclosure, including those attributed to the systems, or various constituent components, may be implemented, at least in part, in hardware, software, firmware, or any combination thereof. For example, various aspects of the techniques may be implemented within one or more processors, including one or more microprocessors, microcontrollers, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry.

Such hardware, software, and/or firmware may be implemented within the same device or within separate devices (e.g., within the system, outside of the system, or a combination of both) to support the various operations and functions described in this disclosure. In addition, any of the described components may be implemented together or separately as discrete but interoperable logic devices. Description of different features is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

Figure 10:
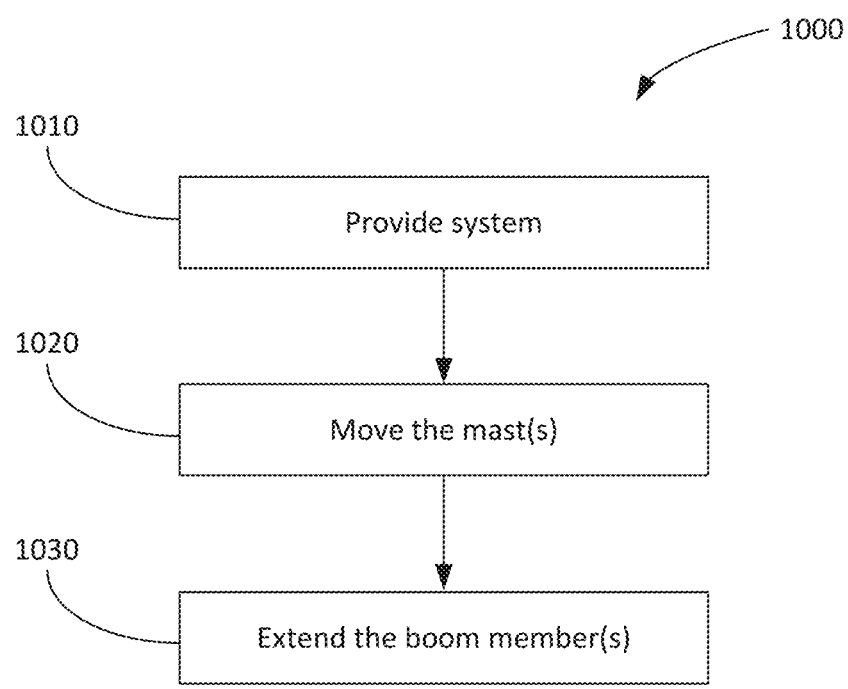
FIG. 10 is a block diagram of an exemplary method of deploying an exemplary deployable sheet material system.

An exemplary method 1000 of deploying an exemplary deployable sheet material system 100 is shown in FIG. 10. The method may include providing 1010 a deployable sheet material system such as, e.g., the deployable sheet material system 100 described herein with reference to FIGS. 2-9. The method 1000 may also include deploying 1020 the distal region of the first mast from proximate the primary beam member to a distance away from the primary beam member. The method 1000 may further include moving one or more masts (e.g., first mast 120, second mast 130) relative a primary beam member (e.g., primary beam member 110) to position a distal region of the one or more masts further away from the primary beam member than when in the stowed configuration and extending a plurality of boom members (e.g., first boom member 150, second boom member 160) and sheet material (e.g., sheet material 142) away from the primary beam member to deploy the sheet material.

The method 1000 may also include releasing the deployable apparatus to extend away from the primary beam member and/or releasing the one or more masts to move relative the primary beam member. In one or more embodiments, the method 1000 may also include tensioning one or more of the plurality of guy wires after the plurality of boom members and the sheet material are extended away from the primary beam member. For example, a tensioner, or tensioner apparatus, may pull the plurality of guy wires until each of the plurality of guy wires is taut and carries a tensile internal load.

All embodiments described herein with regards to the system may be used in conjunction with embodiments described herein with regards to the methods. Additionally, all embodiments described herein with regards to the method may be used in conjunction with embodiments described herein with regards to the system.

The following provides details about a plurality of embodiments of the present disclosure. One or more of the various features described may be used in various combinations to provide such embodiments.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the system and methods described herein. Various modifications of the illustrative embodiments, as well as additional embodiments of the disclosure, will be apparent upon reference to this description.

What is claimed:

1. A system for deploying sheet material from a primary beam member comprising:
   one or more masts coupled to the primary beam member, wherein each of the one or more masts extends between a proximal mast region operably coupled to the primary beam member and a distal mast region, wherein the distal mast region is positioned farther from the primary beam member when the system is in a deployed configuration than when the system is in a stowed configuration;
   one or more boom members extending between a proximal boom end region coupled to the primary beam member and a distal boom end region, wherein the distal boom end region is closer to the primary beam member when in the stowed configuration than when in the deployed configuration;
   a sheet material coupled to the one or more boom members and extending between a proximal sheet region and a distal sheet region, wherein the distal sheet region is closer to the primary beam member when in the stowed configuration than when in the deployed configuration; and
   one or more guy wires extending between the one or more masts and one of the one or more boom members or the sheet material.

2. The system of claim 1, wherein the sheet material extends along a plane when in the deployed configuration, wherein each guy wire of the one or more guy wires extends along a direction that is at an angle to the plane when in the deployed configuration.

3. The system of claim 1, wherein the sheet material is rolled when in the stowed configuration.

4. The system of claim 1, wherein the sheet material is folded when in the stowed configuration.

5. The system of claim 1, wherein the one or more boom members are rolled when in the stowed configuration.

6. The system of claim 1, wherein each mast of the one or more masts comprises a first mast portion and a second mast portion, wherein the first and second mast portions are spaced apart from one another when in the stowed configuration, and wherein the first and second mast portions are in contact with one another when in the deployed configuration.

7. The system of claim 1, wherein the one or more guy wires extend between the distal mast region and one of the distal boom end region or the distal sheet region.

8. The system of claim 1, wherein each boom member of the one or more boom members extends between the proximal boom end region and the distal boom end region along an axis when in the deployed configuration, wherein the sheet material extends on both sides of the boom member transverse to the axis.

9. The system of claim 1, wherein the sheet material comprises one or more photovoltaic arrays.

10. A system for use in deploying sheet material from a primary beam member comprising:
one or more masts coupled to the primary beam member, wherein each of the one or more masts extends between a proximal mast region operably coupled to the primary beam member and a distal mast region;
one or more boom members extending between a proximal boom end region coupled to the primary beam member and a distal boom end region located farther away from the primary beam member than the proximal boom end region;
a sheet material coupled to the one or more boom members and extending between a proximal sheet region proximate to the primary beam member and a distal sheet region located farther away from the primary beam member than the proximal sheet region; and
one or more guy wires extending between the one or more masts and one of the one or more boom members or the sheet material.

11. The system of claim 10, wherein the sheet material extends along a plane, wherein each guy wire of the one or more guy wires extends along a direction that is at an angle to the plane.

12. The system of claim 10, wherein the one or more guy wires extend between the distal mast region and one of the distal boom end region or the distal sheet region.

13. The system of claim 10, wherein each boom member of the one or more boom members extends between the proximal boom end region and the distal boom end region along an axis, wherein the sheet material extends on both sides of each boom member transverse to the axis.

14. The system of claim 10, wherein the one or more boom members comprises a first boom member and a second boom member, wherein the sheet material extends between the first boom member and the second boom member.

15. The system of claim 10, wherein the sheet material comprises one or more photovoltaic arrays.

16. A method of deploying sheet material from a primary beam member comprising:
extending one or more boom members and sheet material coupled thereto away from the primary beam member to deploy the sheet material; and
placing the one or more boom members in compressive loading and one or more guy wires extending from the one or more boom members or the sheet material in tensile loading, wherein the one or more guy wires extend from the one or more boom members to a mast extending between a proximal mast region operably coupled to the primary beam member and a distal mast region.

17. The method of claim 16, wherein the one or more boom members are biased to extend away from the primary beam member, and wherein the method further comprises releasing the one or more boom members to passively deploy the sheet material.

18. The method of claim 16, further comprising tensioning the one or more guy wires after the one or more boom members and the sheet material are extended away from the primary beam member to further place the one or more boom members in compressive loading and the one or more guy wires in tensile loading.

19. The method of claim 16, wherein the sheet material comprises one or more photovoltaic arrays.

* * * * *